(12) United States Patent
Hirata

(10) Patent No.: US 11,960,176 B2
(45) Date of Patent: Apr. 16, 2024

(54) LIQUID CRYSTAL DISPLAY DEVICE

(71) Applicant: Sharp Display Technology Corporation, Kameyama (JP)

(72) Inventor: Mitsuaki Hirata, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/106,465

(22) Filed: Feb. 6, 2023

(65) Prior Publication Data

US 2023/0251532 A1    Aug. 10, 2023

Related U.S. Application Data

(60) Provisional application No. 63/308,174, filed on Feb. 9, 2022.

(30) Foreign Application Priority Data

Apr. 20, 2022    (JP) ................................ 2022-069524

(51) Int. Cl.
     *G02F 1/1343*      (2006.01)
     *G02F 1/1337*      (2006.01)

(52) U.S. Cl.
     CPC .. *G02F 1/134336* (2013.01); *G02F 1/133707* (2013.01); *G02F 1/133746* (2021.01); *G02F 1/133788* (2013.01)

(58) Field of Classification Search
     CPC ......... G02F 1/134336; G02F 1/133707; G02F 1/133788
See application file for complete search history.

(56) References Cited

U.S. PATENT DOCUMENTS

| | | | |
|---|---|---|---|
| 2009/0002588 A1* | 1/2009 | Lee | G02F 1/133707 349/129 |
| 2009/0284703 A1 | 11/2009 | Shoraku et al. | |
| 2010/0123867 A1* | 5/2010 | Jung | G02F 1/133753 349/141 |
| 2011/0043741 A1 | 2/2011 | Hirato | |
| 2011/0261307 A1 | 10/2011 | Shin et al. | |

(Continued)

FOREIGN PATENT DOCUMENTS

| | | |
|---|---|---|
| JP | 5788208 B2 | 9/2015 |
| WO | 2006/132369 A1 | 12/2006 |

(Continued)

*Primary Examiner* — Jia X Pan
(74) *Attorney, Agent, or Firm* — ScienBiziP, P.C.

(57) ABSTRACT

Each pixel of the liquid crystal display device includes a first, second, third, and fourth domains arranged in two rows and two columns, and reference alignment directions of the respective domains are first, second, third, and fourth directions. The first direction and the second direction form an angle of approximately 180°, and the first domain and the second domain are adjacent to each other in an oblique direction. The pixel electrode includes a plurality of first slits formed in a region corresponding to the first domain and extending approximately parallel to the first direction, and a plurality of second slits formed in a region corresponding to the second domain and extending approximately parallel to the second direction, and has no slits in a region corresponding to the third domain and no slits in a region corresponding to the fourth domain.

22 Claims, 51 Drawing Sheets

(56) References Cited

U.S. PATENT DOCUMENTS

| | | | |
|---|---|---|---|
| 2012/0133872 A1* | 5/2012 | Kim | G02F 1/133753 349/128 |
| 2012/0154727 A1* | 6/2012 | Chang | G02F 1/133753 349/139 |
| 2012/0194753 A1* | 8/2012 | Shin | G02F 1/133788 349/123 |
| 2014/0253853 A1* | 9/2014 | Yoshida | G02F 1/133788 349/123 |
| 2016/0054604 A1* | 2/2016 | Hirata | G02F 1/133707 349/123 |
| 2020/0218121 A1* | 7/2020 | Hirata | G02F 1/134336 |

FOREIGN PATENT DOCUMENTS

| | | |
|---|---|---|
| WO | 2009/130908 A1 | 10/2009 |
| WO | 2013/054828 A1 | 4/2013 |

* cited by examiner

EXAMPLE 2

TRANSMITTANCE: 4.38%

EXAMPLE 3

TRANSMITTANCE:
4.32%

EXAMPLE 4

TRANSMITTANCE:
4.41%

LIQUID CRYSTAL DISPLAY DEVICE

CROSS-REFERENCE TO RELATED APPLICATIONS

This application claims the benefit of priority to U.S. Provisional Application No. 63/308,174 filed on Feb. 9, 2022, and Japanese Patent Application Number 2022-069524 filed on Apr. 20, 2022. The entire contents of the above-identified applications are hereby incorporated by reference.

BACKGROUND

Technical Field

The disclosure relates to a liquid crystal display device, and in particular, relates to a liquid crystal display device that includes a vertically aligned liquid crystal layer and in which pretilt directions of liquid crystal molecules are defined by alignment films.

An alignment division structure in which a plurality of liquid crystal domains are formed in one pixel is known as a technique for improving viewing angle characteristics of a vertical alignment (VA) mode liquid crystal display device. In recent years, as a method for forming an alignment division structure, a 4D-reverse twisted nematic (RTN) mode has been proposed.

In the 4D-RTN mode, an alignment division structure is formed by defining pretilt directions of liquid crystal molecules with alignment films. For example, WO 2006/132369 discloses a 4D-RTN mode liquid crystal display device. In the liquid crystal display device disclosed in WO 2006/132369, a four-domain alignment structure is formed by defining pretilt directions with alignment films. That is, when voltage is applied to a liquid crystal layer, four liquid crystal domains are formed in one pixel. Such a four-domain alignment structure may be simply referred to as a 4D structure.

In the liquid crystal display device disclosed in WO 2006/132369, of a pair of alignment films facing each other with the liquid crystal layer interposed therebetween, a pretilt direction defined by one alignment film is different by approximately 90° from a pretilt direction defined by another alignment film. Thus, when voltage is applied, the liquid crystal molecules shift to twist alignment. As can be understood from the disclosure of WO 2006/132369, in the 4D-RTN mode, typically four liquid crystal domains are arranged in two rows and two columns in a pixel.

SUMMARY

In a VAIN mode liquid crystal display device, as described in WO 2006/132369, dark lines parallel to edges (regions darker than other regions) occur in the vicinities of the edges of the pixel electrode. These dark lines cause a decrease in transmittance (light utilization efficiency), and also a decrease in viewing angle characteristics and a decrease in display quality.

WO 2006/132369 discloses that by providing a light blocking portion that blocks the dark lines, it is possible to suppress deterioration of viewing angle characteristics and prevent deterioration of display quality. However, when such a light blocking portion is provided, the decrease in transmittance is not suppressed.

Embodiments of the disclosure have been made in view of the above problems, and an object of the embodiments of the disclosure is to suppress a decrease in transmittance caused by dark lines that occur in the vicinities of edges of a pixel electrode in a VA mode liquid crystal display device in which an alignment division structure is formed by defining pretilt directions with alignment films.

The present specification discloses a liquid crystal display device according to the following items.

[Item 1]

A liquid crystal display device including:

a first substrate and a second substrate facing each other; and a liquid crystal layer being a vertical alignment type and provided between the first substrate and the second substrate, the liquid crystal display device having a plurality of pixels arranged in a matrix including a plurality of rows and a plurality of columns, wherein the first substrate includes a pixel electrode provided in each of the plurality of pixels and a first alignment film provided between the pixel electrode and the liquid crystal layer, the second substrate includes a counter electrode facing the pixel electrode and a second alignment film provided between the counter electrode and the liquid crystal layer, each of the plurality of pixels has a plurality of liquid crystal domains having reference alignment directions different from each other defined by the first alignment film and the second alignment film, the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction, the first direction, the second direction, the third direction, and the fourth direction are four directions in which a difference between any two directions is approximately equal to an integer multiple of 90°, the first liquid crystal domain, the second liquid crystal domain, the third liquid crystal domain, and the fourth liquid crystal domain are arranged in two rows and two columns, the first direction and the second direction form an angle of approximately 180°, and the first liquid crystal domain and the second liquid crystal domain are adjacent to each other in an oblique direction inclined in a row direction and a column direction, among a plurality of edges of the pixel electrode, a portion adjacent to the first liquid crystal domain includes a first edge portion in which an azimuth angle direction orthogonal to the first edge portion and directed toward an inside of the pixel electrode forms an angle of greater than 90° with the first direction, among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction, and the pixel electrode has a plurality of first slits formed in a region corresponding to the first liquid crystal domain and extending approximately parallel to the first direction, and a plurality of second slits formed in a region corresponding to the second liquid crystal domain and extending approximately parallel to the second direction, and no slits in a region corresponding to the third liquid crystal domain and no slits in a region corresponding to the fourth liquid crystal domain.

[Item 2]

The liquid crystal display device according to Item 1,
wherein each of the plurality of pixels has a shape in which a pixel longitudinal direction and a pixel traverse direction are defined, and
each of the first edge portion and the second edge portion extends approximately parallel to the pixel longitudinal direction.

[Item 3]

The liquid crystal display device according to Item 2,
wherein among the plurality of edges of the pixel electrode, a portion adjacent to the third liquid crystal domain includes a third edge portion in which an azimuth angle direction orthogonal to the third edge portion and directed toward the inside of the pixel electrode forms an angle of greater than 90° with the third direction,
among the plurality of edges of the pixel electrode, a portion adjacent to the fourth liquid crystal domain includes a fourth edge portion in which an azimuth angle direction orthogonal to the fourth edge portion and directed toward the inside of the pixel electrode forms an angle of greater than 90° with the fourth direction, and
each of the third edge portion and the fourth edge portion extends approximately parallel to the pixel traverse direction.

[Item 4]

The liquid crystal display device according to Item 1,
wherein each of the first edge portion and the second edge portion includes a portion extending approximately parallel to the row direction and a portion extending approximately parallel to the column direction.

[Item 5]

The liquid crystal display device according to Item 1,
wherein each of the plurality of pixels has a shape in which a pixel longitudinal direction and a pixel traverse direction are defined, and
each of the first edge portion and the second edge portion includes a portion extending approximately parallel to the pixel longitudinal direction and a portion extending approximately parallel to the pixel traverse direction.

[Item 6]

The liquid crystal display device according to Item 4 or 5,
wherein among the plurality of edges of the pixel electrode, a portion adjacent to the third liquid crystal domain does not include an edge portion in which an azimuth angle direction orthogonal to the edge portion and directed toward the inside of the pixel electrode forms an angle of greater than 90° with the third direction, and
among the plurality of edges of the pixel electrode, a portion adjacent to the fourth liquid crystal domain does not include an edge portion in which an azimuth angle direction orthogonal to the edge portion and directed toward the inside of the pixel electrode forms an angle of greater than 90° with the fourth direction.

[Item 7]

The liquid crystal display device according to any one of Items 1 to 6,
wherein the plurality of first slits are arranged over substantially an entire region corresponding to the first liquid crystal domain, and
the plurality of second slits are arranged over substantially an entire region corresponding to the second liquid crystal domain.

[Item 8]

A liquid crystal display device including:
a first substrate and a second substrate facing each other; and
a liquid crystal layer being a vertical alignment type and provided between the first substrate and the second substrate, the liquid crystal display device having a plurality of pixels arranged in a matrix including a plurality of rows and a plurality of columns,
wherein the first substrate includes a pixel electrode provided in each of the plurality of pixels and a first alignment film provided between the pixel electrode and the liquid crystal layer,
the second substrate includes a counter electrode facing the pixel electrode and a second alignment film provided between the counter electrode and the liquid crystal layer,
each of the plurality of pixels has a plurality of liquid crystal domains having reference alignment directions different from each other defined by the first alignment film and the second alignment film,
the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction,
the first direction, the second direction, the third direction, and the fourth direction are four directions in which a difference between any two directions is approximately equal to an integer multiple of 90°,
the first liquid crystal domain, the second liquid crystal domain, the third liquid crystal domain, and the fourth liquid crystal domain are arranged in two rows and two columns,
the first direction and the second direction form an angle of approximately 180°, and the first liquid crystal domain and the second liquid crystal domain are adjacent to each other in an oblique direction inclined in a row direction and a column direction,
among a plurality of edges of the pixel electrode, a portion adjacent to the first liquid crystal domain includes a first edge portion in which an azimuth angle direction orthogonal to the first edge portion and directed toward the inside of the pixel electrode forms an angle of greater than 90° with the first direction,
among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction,
the pixel electrode has a plurality of first slits formed in a region corresponding to the first liquid crystal domain and extending approximately parallel to the first direction, and a plurality of second slits formed in a region corresponding to the second liquid crystal domain and extending approximately parallel to the second direction, each of the plurality of pixels has a shape in which a pixel longitudinal direction and a pixel traverse direction are defined, the third liquid crystal domain is adjacent to the first liquid crystal domain in the pixel longitudinal direction and adjacent to the second liquid crystal domain in the pixel traverse direction, the fourth liquid crystal domain is adjacent to the first liquid crystal domain in the pixel traverse direction and adjacent to the second liquid crystal domain in the pixel longitudinal direction, the pixel electrode further includes a plurality of third slits formed in a region corresponding to the third liquid crystal domain and extending approximately parallel to the third direction, and a plurality of fourth slits formed in a region corresponding to the fourth liquid crystal domain and extending approximately parallel to the fourth direction, each of the plurality of third slits is shorter than at least some first slits among the plurality of first slits and at least some second slits among the plurality of second slits, and is located in a vicinity of the second liquid crystal domain in the region corresponding to the third liquid crystal domain, and each of the plurality of fourth slits is shorter than at least some first slits among the plurality of first slits and at least some second slits among the plurality of second slits, and is located in a vicinity of the first liquid crystal domain in the region corresponding to the fourth liquid crystal domain.

[Item 9]

The liquid crystal display device according to Item 8, wherein each of the first edge portion and the second edge portion extends approximately parallel to the pixel longitudinal direction.

[Item 10]

The liquid crystal display device according to Item 9, wherein among the plurality of edges of the pixel electrode, a portion adjacent to the third liquid crystal domain includes a third edge portion in which an azimuth angle direction orthogonal to the third edge portion and directed toward the inside of the pixel electrode forms an angle of greater than 90° with the third direction, among the plurality of edges of the pixel electrode, a portion adjacent to the fourth liquid crystal domain includes a fourth edge portion in which an azimuth angle direction orthogonal to the fourth edge portion and directed toward the inside of the pixel electrode forms an angle of greater than 90° with the fourth direction, and each of the third edge portion and the fourth edge portion extends approximately parallel to the pixel traverse direction.

[Item 11]

The liquid crystal display device according to Item 8, wherein each of the first edge portion and the second edge portion includes a portion extending approximately parallel to the pixel longitudinal direction and a portion extending approximately parallel to the pixel traverse direction.

[Item 12]

The liquid crystal display device according to Item 11, wherein among the plurality of edges of the pixel electrode, a portion adjacent to the third liquid crystal domain does not include an edge portion in which an azimuth angle direction orthogonal to the edge portion and directed toward the inside of the pixel electrode forms an angle of greater than 90° with the third direction, and among the plurality of edges of the pixel electrode, a portion adjacent to the fourth liquid crystal domain does not include an edge portion in which an azimuth angle direction orthogonal to the edge portion and directed toward the inside of the pixel electrode forms an angle of greater than 90° with the fourth direction.

[Item 13]

The liquid crystal display device according to Item 8, 11, or 12, wherein a third slit located at a position closest to the fourth liquid crystal domain among the plurality of third slits is contiguous with a fourth slit located at a position closest to the third liquid crystal domain among the plurality of fourth slits.

[Item 14]

The liquid crystal display device according to any one of Items 8 to 13, wherein the plurality of first slits are arranged over substantially an entire region corresponding to the first liquid crystal domain, and the plurality of second slits are arranged over substantially an entire region corresponding to the second liquid crystal domain.

[Item 15]

The liquid crystal display device according to any one of Items 8 to 14, wherein each of the plurality of third slits is shorter than one-half of a width of the third liquid crystal domain along the pixel traverse direction, and each of the plurality of fourth slits is shorter than one-half of a width of the fourth liquid crystal domain along the pixel traverse direction.

[Item 16]

The liquid crystal display device according to any one of Items 8 to 15, wherein a length of each of the plurality of third slits is 6 μm or more and 10 μm or less, and a length of each of the plurality of fourth slits is 6 μm or more and 10 μm or less.

[Item 17]

A liquid crystal display device including:

a first substrate and a second substrate facing each other; and a liquid crystal layer being a vertical alignment type and provided between the first substrate and the second substrate, the liquid crystal display device having a plurality of pixels arranged in a matrix including a plurality of rows and a plurality of columns, wherein the first substrate includes a pixel electrode provided in each of the plurality of pixels and a first alignment film provided between the pixel electrode and the liquid crystal layer, the second substrate includes a counter electrode facing the pixel electrode and a second alignment film provided between the counter electrode and the liquid crystal layer, each of the plurality of pixels has a plurality of liquid crystal domains having reference alignment directions different from each other defined by the first alignment film and the second alignment film, the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction, the first direction, the second direction, the third direction, and the fourth direction are four directions in which a difference between any two directions is approximately equal to an integer multiple of 90°, the first liquid crystal domain, the second liquid crystal domain, the third liquid crystal domain, and the fourth liquid crystal domain are arranged in two rows and two columns, the first direction and the second direction form an angle of approximately 180°, and the first liquid crystal domain and the second liquid crystal domain are adjacent to each other in an oblique direction inclined in a row direction and a column direction, among a plurality of edges of the pixel electrode, a portion adjacent to the first liquid crystal domain includes a first edge portion in which an azimuth angle direction orthogonal to the first edge portion and directed toward the inside of the pixel electrode forms an angle of greater than 90° with the first direction, among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction, each of the plurality of pixels has a shape in which a pixel longitudinal direction and a pixel traverse direction are defined, each of the first edge portion and the second edge portion includes a first portion extending approximately parallel to the pixel longitudinal direction and a second portion extending approximately parallel to the pixel traverse direction, the pixel electrode has a plurality of first slits formed in a region corresponding to the first liquid crystal domain and extending approximately parallel to the first direction, a plurality of second slits formed in a region corresponding to the second liquid crystal domain and extending approximately parallel to the second direction, a plurality of third slits formed in a region corresponding to the third liquid crystal domain and extending approximately parallel to the third direction, and a plurality of fourth slits formed in a region corresponding to the fourth liquid crystal domain and extending approximately parallel to the fourth direction, the third liquid crystal domain is adjacent to the first liquid crystal domain in the pixel longitudinal direction and adjacent to the second liquid crystal domain in the pixel traverse direction, the fourth liquid crystal domain is adjacent to the first liquid crystal domain in the pixel traverse direction and adjacent to the second liquid crystal domain in the pixel longitudinal direction, each of the plurality of third slits is shorter than one-half of a width of the third liquid crystal domain along the pixel traverse direction, and is located in a vicinity of the second liquid crystal domain in the region corresponding to the third liquid crystal domain, each of the plurality of fourth slits is shorter than one-half of a width of the fourth liquid crystal domain along the pixel traverse direction, and is located in a vicinity of the first liquid crystal domain in the region corresponding to the fourth liquid crystal domain, the number of the plurality of first slits is less than the number of the plurality of third slits and the number of the plurality of fourth slits, the number of the plurality of second slits is less than the number of the plurality of third slits and the number of the plurality of fourth slits, each of the plurality of first slits is shorter than a width of the first liquid crystal domain along the pixel traverse direction, and is located in a vicinity of an intersection of the first portion and the second portion of the first edge portion in the region corresponding to the first liquid crystal domain, and each of the plurality of second slits is shorter than a width of the second liquid crystal domain along the pixel traverse direction, and is located in a vicinity of an intersection of the first portion and the second portion of the second edge portion in the region corresponding to the second liquid crystal domain.

[Item 18]

The liquid crystal display device according to Item 17, wherein a length of each of the plurality of third slits is 6 µm or more and 10 µm or less, and a length of each of the plurality of fourth slits is 6 µm or more and 10 µm or less.

[Item 19]

The liquid crystal display device according to Item 17 or 18, wherein the plurality of first slits are three first slits, among the three first slits, one first slit is longer than other two first slits, and is arranged between the other two first slits, the plurality of second slits are three second slits, and among the three second slits, one second slit is longer than other two second slits, and is arranged between the other two second slits.

[Item 20]

The liquid crystal display device according to Item 19, wherein a length of the one first slit among the three first slits is 11 µm or more and 15 µm or less, and a length of the other two first slits is 6 µm or more and 10 µm or less, and a length of the one second slit among the three second slits is 11 µm or more and 15 µm or less, and a length of the other two second slits is 6 µm or more and 10 µm or less.

[Item 21]

A liquid crystal display device including:

a first substrate and a second substrate facing each other; and a liquid crystal layer being a vertical alignment type and provided between the first substrate and the second substrate, the liquid crystal display device having a plurality of pixels arranged in a matrix including a plurality of rows and a plurality of columns, wherein the first substrate includes a pixel electrode provided in each of the plurality of pixels and a first alignment film provided between the pixel electrode and the liquid crystal layer, the second substrate includes a counter electrode facing the pixel electrode and a second alignment film provided between the counter electrode and the liquid crystal layer, each of the plurality of pixels has a plurality of liquid crystal domains having reference alignment directions different from each other defined by the first alignment film and the second alignment film, the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction, the first direction, the second direction, the third direction, and the fourth direction are four directions in which a difference between any two directions is approximately equal to an integer multiple of 90°, the first liquid crystal domain, the second liquid crystal domain, the third liquid crystal domain, and the fourth liquid crystal domain are arranged in two rows and two columns, the first direction and the second direction form an angle of approximately 180°, and the first liquid crystal domain and the second liquid crystal domain are adjacent to each other in an oblique direction inclined in a row direction and a column direction, among a plurality of edges of the pixel electrode, a portion adjacent to the first liquid crystal domain includes a first edge portion in which an azimuth angle direction orthogonal to the first edge portion and directed toward the inside of the pixel electrode forms an angle of greater than 90° with the first direction, among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction, each of the plurality of pixels has a shape in which a pixel longitudinal direction and a pixel traverse direction are defined, each of the first edge portion and the second edge portion includes a first portion extending approximately parallel to the pixel longitudinal direction and a second portion extending approximately parallel to the pixel traverse direction, the pixel electrode has a plurality of first slits formed in a region corresponding to the first liquid crystal domain and extending approximately parallel to the first direction, a plurality of second slits formed in a region corresponding to the second liquid crystal domain and extending approximately parallel to the second direction, a plurality of third slits formed in a region corresponding to the third liquid crystal domain and extending approximately parallel to the third direction, and a plurality of fourth slits formed in a region corresponding to the fourth liquid crystal domain and extending approximately parallel to the fourth direction, the third liquid crystal domain is adjacent to the first liquid crystal domain in the pixel longitudinal direction and adjacent to the second liquid crystal domain in the pixel traverse direction, the fourth liquid crystal domain is adjacent to the first liquid crystal domain in the pixel traverse direction and adjacent to the second liquid crystal domain in the pixel longitudinal direction, and a third slit located at a position closest to the fourth liquid crystal domain among the plurality of third slits is contiguous with a fourth slit located at a position closest to the third liquid crystal domain among the plurality of fourth slits.

[Item 22]

The liquid crystal display device according to any one of Items 1 to 21, wherein each of the first alignment film and the second alignment film is photo-alignment film.

[Item 23]

The liquid crystal display device according to any one of Items 1 to 22, wherein in each of the plurality of liquid crystal domains, a pretilt direction defined by the first alignment film and a pretilt direction defined by the second alignment film are different from each other by approximately 90°.

According to the embodiments of the disclosure, in a VA mode liquid crystal display device in which an alignment division structure is formed by defining the pretilt directions with the alignment films, a decrease in transmittance caused by dark lines that occur in the vicinities of edges of a pixel electrode can be suppressed.

BRIEF DESCRIPTION OF DRAWINGS

The disclosure will be described with reference to the accompanying drawings, wherein like numbers reference like elements.

DESCRIPTION OF EMBODIMENTS

Figure 1:
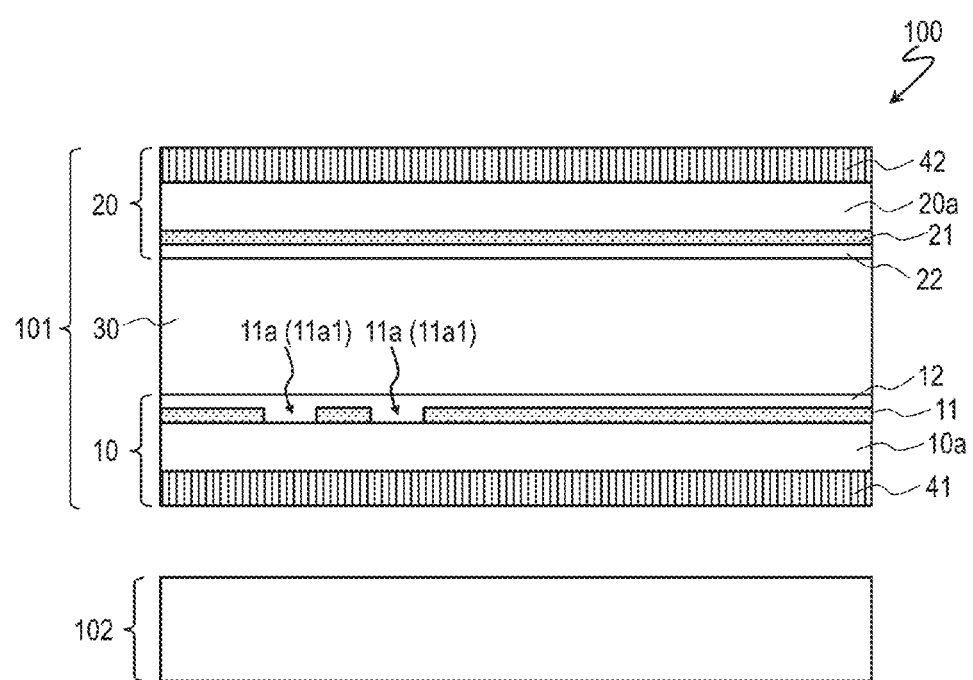
FIG. 1 is a cross-sectional view schematically illustrating a liquid crystal display device 100 according to an embodiment of the disclosure, illustrating a cross-section along line 1A-1A' in FIG. 2.

First, main terms used herein will be described.

As used herein, the term "vertically aligned liquid crystal layer" refers to a liquid crystal layer in which liquid crystal molecules are aligned approximately perpendicularly (e.g., at an angle of approximately 85° or greater) to a surface of an alignment film (vertical alignment film). Liquid crystal molecules contained in the vertically aligned liquid crystal layer have negative dielectric anisotropy. By combining the vertically aligned liquid crystal layer with a pair of polarizers arranged in crossed-Nicols so as to face each other with the liquid crystal layer interposed therebetween (i.e., arranged so that transmission axes of the polarizers are approximately orthogonal to each other), a normally black mode is displayed.

As used herein, the term "pixel" refers to the smallest unit that represents a specific gray scale in a display, and in a color display, for example, corresponds to a unit that represents the gray scale of each of R, G, and B. A combination of an R pixel, a G pixel, and a B pixel forms one color display pixel. As used herein, a region of a liquid crystal display device (pixel region) corresponding to a "pixel" in display is also referred to as a "pixel".

The term "pretilt direction" refers to an alignment direction of liquid crystal molecules defined by an alignment film, which is an azimuth angle direction in a display surface. The angle at which the liquid crystal molecules are aligned relative to a surface of the alignment film is referred to as a "pretilt angle". An alignment treatment applied to the alignment film (a treatment, to the alignment film, for expressing the ability to define a pretilt direction in a predetermined direction) is preferably performed by a photo-alignment treatment as described later.

A four-domain structure can be formed by changing the combination of the pretilt directions of a pair of alignment films facing each other with the liquid crystal layer interposed therebetween. When a pixel (pixel region) is divided into four, the pixel has four liquid crystal domains.

Each liquid crystal domain is characterized by a tilt direction (also referred to as a "reference alignment direction") of liquid crystal molecules at or near the center in a layer plane and in a thickness direction of the liquid crystal layer when voltage is applied to the liquid crystal layer. This tilt direction (reference alignment direction) has a dominant effect on the viewing angle dependence of each domain. When considering a vector of a liquid crystal molecule directed from an end portion thereof closer to a back substrate toward an end portion thereof farther from the back substrate (i.e., an end portion closer to a front substrate) (i.e., a vector directed from a tip toward a head of a pin illustrated in FIG. 30A, etc. to be described later), the tilt direction is a direction indicated by a component of this vector in a substrate plane (projection on the substrate plane), which is an azimuth angle direction. An azimuth angle direction is measured with reference to a horizontal direction in the display surface, and a counterclockwise rotation is a positive rotation (when the display surface is compared to a clock face, a three o'clock direction is denoted as an azimuth angle of 0°, and a counterclockwise rotation represents a positive rotation). By setting the tilt directions in the four liquid crystal domains so that the angle (difference) between any two of the tilt directions is approximately equal to an integer multiple of 90° (e.g., the 10:30 direction, 7:30 direction, 4:30 direction, and 1:30 direction), the viewing angle characteristics are averaged, and thus, a good display can be obtained. From the viewpoint of uniformity of viewing angle characteristics, it is preferable that the four liquid crystal domains have approximately equal areas in the pixel region.

A vertically aligned liquid crystal layer exemplified in the following embodiments contains liquid crystal molecules having negative dielectric anisotropy (nematic liquid crystal material having negative dielectric anisotropy), and a pretilt direction defined by one alignment film and a pretilt direction defined by another alignment film are different from each other by approximately 90°. These two pretilt directions define a tilt direction (reference alignment direction) in the liquid crystal domain. When voltage is applied to the liquid crystal layer, the liquid crystal molecules in the vicinity of the alignment film are twisted according to the alignment regulating force of the alignment film. A chiral agent may not be added to the liquid crystal layer, or a chiral agent may be added as necessary. Thus, the VA mode in which the liquid crystal molecules are twisted by using a pair of vertical alignment films provided so that the pretilt directions (alignment treatment directions) are orthogonal to each other, may be referred to as a vertical alignment twisted nematic (VATN) mode. In the VATN mode, it is preferable that the pretilt angles defined by the pair of alignment films, respectively, are approximately equal to each other.

A photo-alignment treatment is preferable as the alignment treatment for the alignment films from the viewpoint of mass productivity. In addition, since the photo-alignment treatment can be performed in a non-contact manner, static electricity does not occur, which may occur due to friction as in a rubbing treatment, leading to prevention of a decrease in yield. Further, by using a photo-alignment film containing a photosensitive group, variations in the pretilt angles can be suppressed.

Next, the alignment division structure in the 4D-RTN mode will be described.

Figure 29:
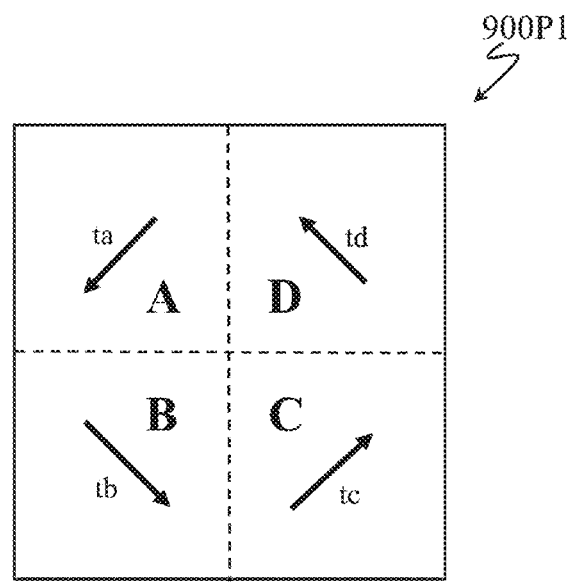
FIG. 29 is a diagram illustrating an alignment division structure of a pixel 900P1 in a typical 4D-RTN mode liquid crystal display device.

FIG. 29 illustrates an alignment division structure of a pixel 900P1 in a typical 4D-RTN mode liquid crystal display device. When voltage is applied to a liquid crystal layer, four liquid crystal domains A, B, C, and D are formed in the pixel 900P1 as illustrated in FIG. 29. The four liquid crystal domains A, B, C, and D are arranged in a matrix of two rows and two columns.

Azimuthal directions of directors ta, tb, tc, and td in the liquid crystal domains A, B, C, and D are four azimuthal directions in which an angle between any two azimuthal directions is approximately an integer multiple of 90°. Each of the directors ta, tb, tc, and td is representative of the alignment direction of the liquid crystal molecules contained in each of the liquid crystal domains, and in the 4D-RTN mode, each of the directors ta, tb, tc, and td is the tilt direction of the liquid crystal molecules at or near the center in a layer plane and in a thickness direction of the liquid crystal layer when voltage is applied to the liquid crystal layer (that is, at or near the center when the liquid crystal domain is viewed from a direction normal to a display surface and when viewed in cross section along the direction normal to the display surface). Each liquid crystal domain is characterized by an azimuthal direction of the director (tilt direction as described above), which has a dominant effect on the viewing angle dependence of each domain.

Here, a pair of polarizers facing each other with the liquid crystal layer interposed therebetween are arranged so that transmission axes (polarization axes) thereof are orthogonal to each other. More specifically, the pair of polarizers are arranged so that the transmission axis of one polarizer is parallel to the horizontal direction of the display surface (3 o'clock direction, 9 o'clock direction) and the transmission axis of another polarizer is parallel to the vertical direction of the display surface (12 o'clock direction, 6 o'clock direction).

When a horizontal azimuth angle (3 o'clock direction) on the display surface is 0°, an azimuthal direction of the director to in the liquid crystal domain A is an approximately 225° direction, an azimuthal direction of the director tb in the liquid crystal domain B is an approximately 315° direction, an azimuthal direction of the director tc in the liquid crystal domain C is an approximately 45° direction, and an azimuthal direction of the director td in the liquid crystal domain D is an approximately 135° direction. That is, the liquid crystal domains A, B, C, and D are arranged such that the azimuthal directions of the directors therein differ by approximately 90° between adjacent liquid crystal domains in the row direction and between adjacent liquid crystal domains in the column direction.

Figure 30A:
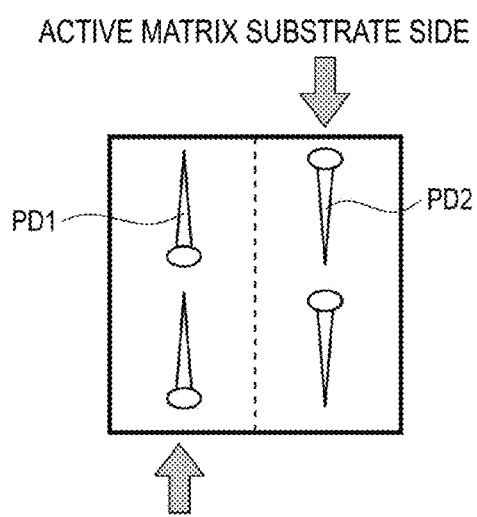
FIG. 30A is a diagram for describing a method for obtaining the alignment division structure of the pixel 900P1.
Figure 30B:
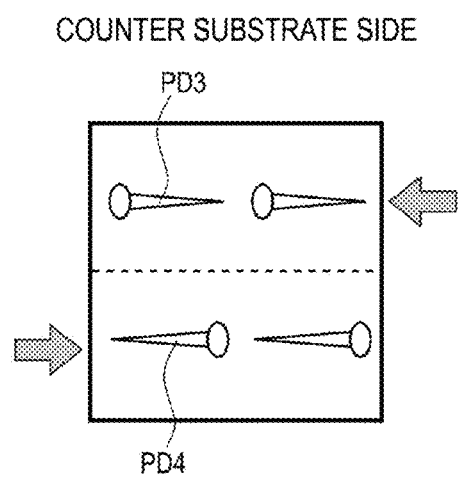
FIG. 30B is a diagram for describing the method for obtaining the alignment division structure of the pixel 900P1.
Figure 30C:
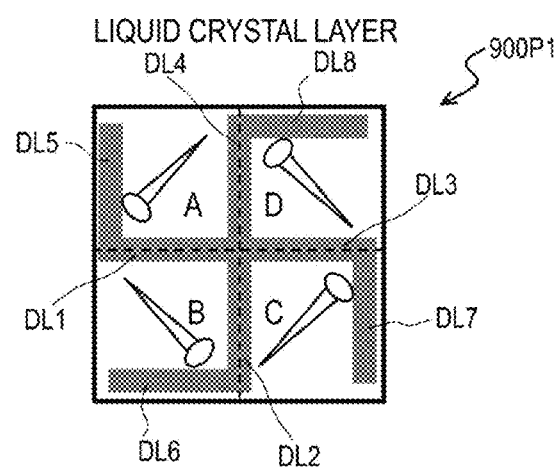
FIG. 30C is a diagram for describing the method for obtaining the alignment division structure of the pixel 900P1.

Referring to FIGS. 30A, 30B, and 30C, an alignment division method for obtaining the alignment division structure of the pixel 900P1 illustrated in FIG. 29 will be described. FIG. 30A illustrates pretilt directions PD1 and PD2 defined by an alignment film provided in an active matrix substrate, and FIG. 30B illustrates pretilt directions PD3 and PD4 defined by an alignment film provided in a counter substrate. FIG. 30C illustrates tilt directions (directors) when voltage is applied to the liquid crystal layer after bonding the active matrix substrate and the counter substrate together. FIGS. 30A, 30B, and 30C illustrate the active matrix substrate, the counter substrate, and the liquid crystal layer as viewed from the viewer side. Thus, in FIG. 30A, the alignment film is positioned on the front side of the paper relative to the substrate, and in FIG. 30B, the alignment film is positioned on the back side of the paper relative to the substrate. Each of the pretilt directions and the tilt directions is illustrated schematically in a shape of a pin, and a head of the pin (an end portion with a larger area) represents an end portion on the front side (viewer side) of a liquid crystal molecule, and a tip of the pin (an end portion with a smaller area) represents an end portion of the back side of the liquid crystal molecule.

The region on the active matrix substrate side (the region corresponding to one pixel 900P1) is divided into two regions on the right and left as illustrated in FIG. 30A, and an alignment treatment is performed so that the alignment films (vertical alignment films) of the individual regions (right region and left region) define pretilt directions PD1 and PD2 that are antiparallel to each other. Here, a photo-alignment treatment is performed by obliquely irradiating ultraviolet rays (e.g., linearly polarized ultraviolet rays) from directions indicated by arrows.

On the other hand, the region on the counter substrate side (the region corresponding to one pixel region 900P1) is divided into two regions, upper and lower as illustrated in FIG. 30B, and an alignment treatment is performed so that the alignment films (vertical alignment films) of the individual regions (upper region and lower region) define pretilt directions PD3 and PD4 that are antiparallel to each other. Here, a photo-alignment treatment is performed by obliquely irradiating ultraviolet rays (e.g., linearly polarized ultraviolet rays) from directions indicated by arrows.

By bonding the active matrix substrate and the counter substrate that have been subjected to the alignment treatments as illustrated in FIGS. 30A and 30B, the pixel 900P1 in which the alignment is divided as illustrated in FIG. 30C can be formed. As can be seen from FIGS. 30A, 30B, and 30C, for each of the liquid crystal domains A to D, the pretilt direction defined by the photo-alignment film in the active matrix substrate and the pretilt direction defined by the photo-alignment film in the counter substrate differ from each other by approximately 90°. These two pretilt directions define the tilt direction (azimuthal direction of the director in each liquid crystal domain). As illustrated in the figures, the tilt direction is defined in the middle direction of the pin directions corresponding to the two pretilt directions.

As illustrated in FIG. 30C, dark lines DL1 to DL8 occur in the pixel 900P1 having the alignment division structure. Among the dark lines DL1 to DL8, the dark lines DL1 to DL4 occur at boundaries between adjacent liquid crystal domains, and the dark lines DL5 to DL8 occur in the vicinities of edges of the pixel electrode. In the example illustrated in FIG. 30C, the dark lines DL1 to DL8 form a right swastika shape as a whole.

Figure 31:
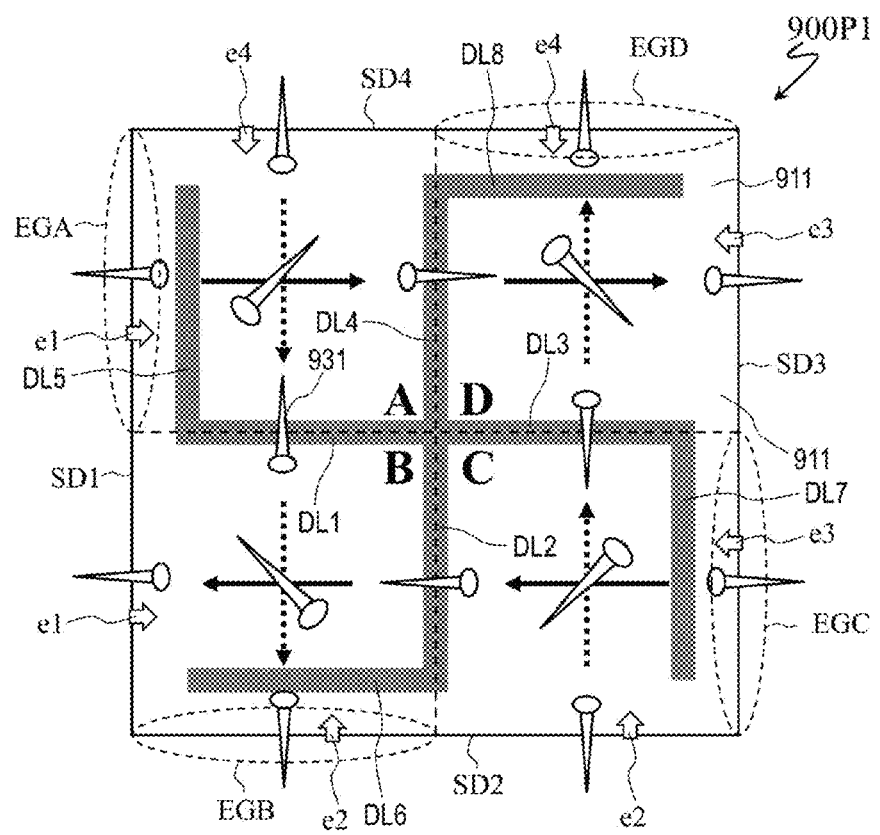
FIG. 31 is a plan view schematically illustrating an alignment state of liquid crystal molecules 931 in the pixel 900P1.

The reason why such dark lines DL1 to DL8 occur will be described below with reference to FIG. 31. FIG. 31 is a plan view schematically illustrating an alignment state of liquid crystal molecules 931 in the pixel 900P1.

First, the reason why the dark lines DL1 to DL4 occur will be described.

When voltage is applied between a pixel electrode 911 and a counter electrode, a vertical electrical field is generated in the liquid crystal layer, and the liquid crystal molecules 931 in the liquid crystal layer are aligned in a direction orthogonal to the electrical field. That is, the liquid crystal molecules 931 tilt so as to be parallel to the substrate plane. At this time, the azimuthal directions of the directors of the liquid crystal molecules 931 in the individual liquid crystal domains are defined by the pretilt directions defined by the alignment film on the active matrix substrate side (indicated by dotted arrows in FIG. 31) and the pretilt directions defined by the alignment film on the counter substrate side (indicated by solid arrows in FIG. 31). Specifically, the azimuthal directions of the directors in the liquid crystal domains A, B, C, and D are an approximately 225° direction, an approximately 315° direction, an approximately 45° direction, and an approximately 135° direction, respectively.

At and in the vicinity of the boundary between adjacent liquid crystal domains, the alignment directions of the liquid crystal molecules 931 change continuously (due to the nature of the liquid crystal as a continuous elastic body). Thus, for example, at the boundary between the liquid crystal domain A and the liquid crystal domain B, the liquid crystal molecule 931 is aligned in an approximately 270° direction. Similarly, at the boundary between the liquid crystal domain B and the liquid crystal domain C, the boundary between the liquid crystal domain C and the liquid crystal domain D, and the boundary between the liquid crystal domain D and the liquid crystal domain A, the liquid crystal molecule 931 are aligned in an approximately 0° direction, an approximately 90° direction, and an approximately 180° direction, respectively. Since the 0° direction, the 90° direction, the 180° direction, and the 270° direction are directions parallel to or orthogonal to the transmission axes of the pair of polarizers, the dark lines DL1 to DL4 occur at the boundaries between adjacent liquid crystal domains.

Next, the reason why the dark lines DL5 to DL8 occur will be described.

When the edge of the pixel electrode 911 adjacent to the liquid crystal domain includes a portion where an azimuth angle direction orthogonal to the edge and directed toward the inside of the pixel electrode 911 forms an angle of greater than 90° with the tilt direction (reference alignment direction) in the liquid crystal domain (hereinafter referred to as an "edge portion"), a dark line is formed inside the edge portion and parallel thereto.

As illustrated in FIG. 31, the pixel electrode 911 has four edges (sides) SD1, SD2, SD3, and SD4, and oblique electrical fields generated at the edges SD1, SD2, SD3, and SD4 when voltage is applied exert alignment regulating forces that are orthogonal to the respective edges and have components in the directions toward the inside of the pixel electrode 911 (azimuth angle directions). In FIG. 31, the azimuth angle directions orthogonal to the four edges SD1, SD2, SD3, and SD4 and toward the inside of the pixel electrode 911 are indicated by arrows e1, e2, e3, and e4.

The four liquid crystal domains A, B, C, and D are each adjacent to two of the four edges SD1, SD2, SD3, and SD4 of the pixel electrode 911, and are subjected to the alignment regulating forces due to the oblique electrical fields generated at the corresponding edges when voltage is applied.

At an edge portion EGA among the edges of the pixel electrode 911 to which the liquid crystal domain A is adjacent (the upper half of the left edge SD1), the azimuth angle direction e1 orthogonal to the edge portion EGA and directed toward the inside of the pixel electrode 911 forms an angle of greater than 90° (specifically, approximately) 135° with a tilt direction to in the liquid crystal domain A. As a result, in the liquid crystal domain A, the dark line DL5 occurs parallel to the edge portion EGA when voltage is applied.

Similarly, at an edge portion EGB among the edges of the pixel electrode 911 to which the liquid crystal domain B is adjacent (the left half of the lower edge SD2), the azimuth angle direction e2 orthogonal to the edge portion EGB and directed toward the inside of the pixel electrode 911 forms an angle of greater than 90° (specifically, approximately 135°) with a tilt direction tb in the liquid crystal domain B.

As a result, in the liquid crystal domain B, the dark line DL6 occurs parallel to the edge portion EGB when voltage is applied.

Similarly, at an edge portion EGC among the edges of the pixel electrode 911 to which the liquid crystal domain C is adjacent (the lower half of the right edge SD3), the azimuth angle direction e3 orthogonal to the edge portion EGC and directed toward the inside of the pixel electrode 911 forms an angle of greater than 90° (specifically, approximately 135°) with a tilt direction tc in the liquid crystal domain C. As a result, in the liquid crystal domain C, the dark line DL7 occurs parallel to the edge portion EGC when voltage is applied.

Similarly, at an edge portion EGD among the edges of the pixel electrode 911 to which the liquid crystal domain D is adjacent (the right half of the upper edge SD4), the azimuth angle direction e4 orthogonal to the edge portion EGD and directed toward the inside of the pixel electrode 911 forms an angle of greater than 90° (specifically, approximately 135°) with a tilt direction td in the liquid crystal domain D. As a result, in the liquid crystal domain D, the dark line DL8 occurs parallel to the edge portion EGD when voltage is applied.

Figure 32:
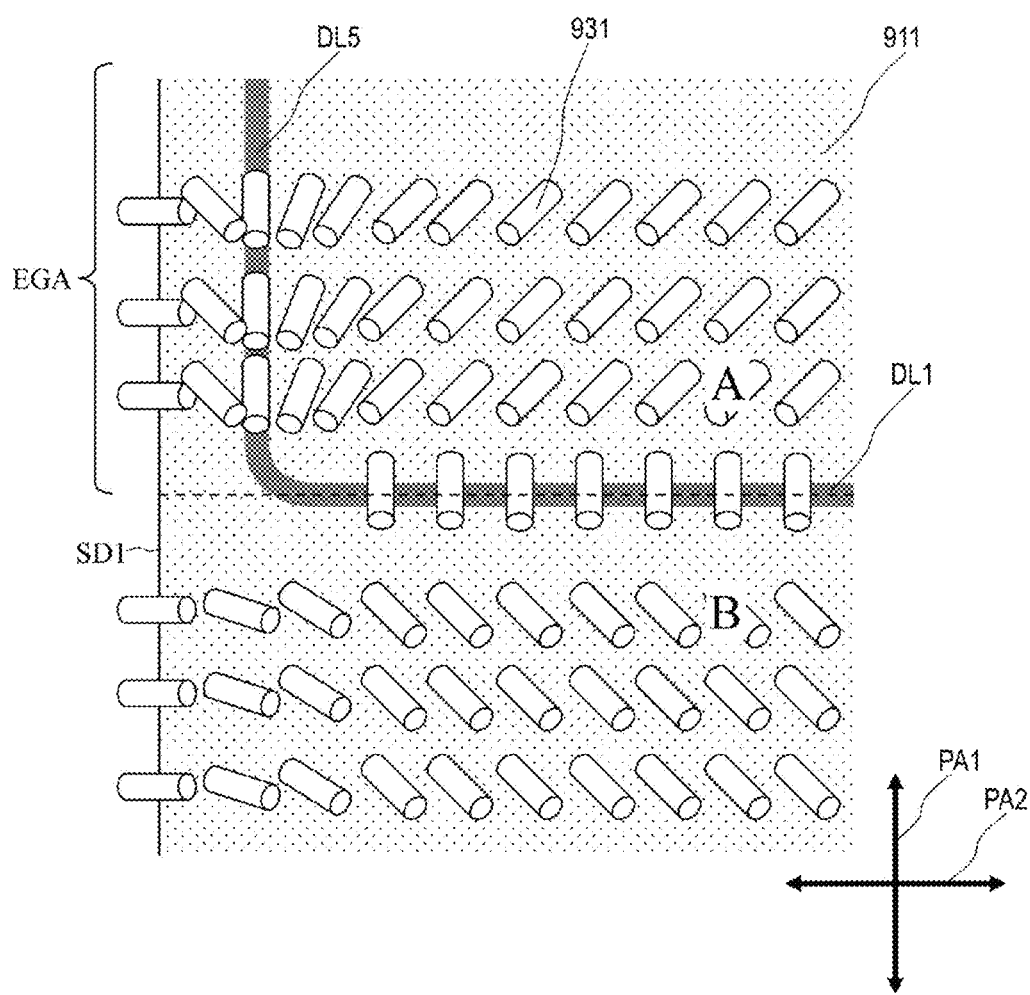
FIG. 32 is a plan view illustrating an alignment state of the liquid crystal molecules 931 in the vicinity of an edge SD1 of a pixel electrode 911.

FIG. 32 illustrates an alignment state of the liquid crystal molecules 931 in the vicinity of the edge SD1. As illustrated in FIG. 32, in the vicinity of the edge portion EGA of the edge SD1, there is a region in which the liquid crystal molecules 931 are aligned in a direction approximately parallel to the transmission axis PA1 and approximately orthogonal to the transmission axis PA2 of the pair of polarizers (direction of approximately 270°) as a result of continuous alignment change from the direction orthogonal to the edge SD1 (approximately 0° direction) to the tilt direction ta in the liquid crystal domain A (approximately 225° direction). This region is the dark line DL5.

In contrast, in the vicinity of a portion of the edge SD1 other than the edge portion EGA, the alignment changes continuously from the direction orthogonal to the edge SD1 (approximately 0° direction) to the tilt direction tb (approximately 315° direction) in the liquid crystal domain B, but there is no region where the liquid crystal molecules 931 are aligned in the direction approximately parallel to the transmission axis PA1 and approximately orthogonal to the transmission axis PA2 of the polarizers. Thus, no dark line occurs.

For the other edges SD2, SD3, and SD4, for the same reason, the dark lines DL6, DL7, and DL8 occur in the vicinities of the edge portions EGB, EGC, and EGD, but dark lines do not occur in the vicinities of portions other than the edge portions EGB, EGC, and EGD.

Figure 33:
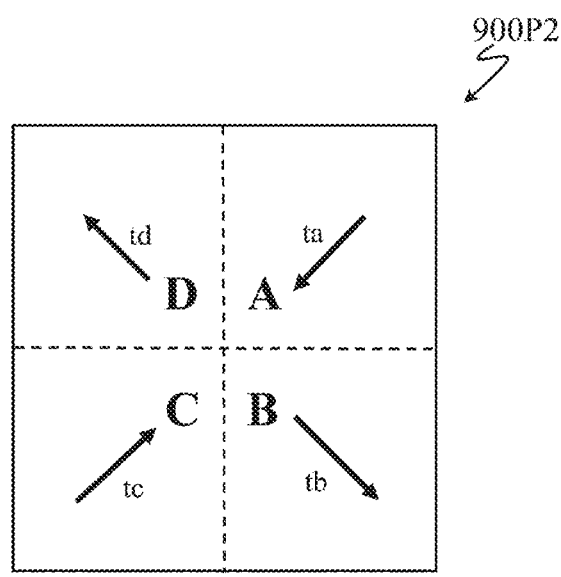
FIG. 33 is a diagram illustrating another example of an alignment division structure in a typical 4D-RTN mode liquid crystal display device.

FIG. 33 illustrates another example of an alignment division structure. In a pixel 900P2 illustrated in FIG. 33, similar to the pixel 900P1 illustrated in FIG. 29, four liquid crystal domains A to D arranged in a matrix of two rows and two columns are formed. Azimuthal directions of directors ta to td in liquid crystal domains A to D in the pixel 900P2 are the same as the azimuthal directions of the directors ta to td in the liquid crystal domains A to D in the pixel 900P1. However, in the pixel 900P1, the liquid crystal domains A to D are arranged in the order of upper left, lower left, lower right, and upper right (i.e., counterclockwise from the upper left), whereas in the pixel 900P2, the liquid crystal domains A to D are arranged in the order of the upper right, lower right, lower left, and upper left (i.e., clockwise from the upper right). This is because, the pretilt directions are opposite for the left region and the right region of the active matrix substrate for the pixel 900P1 and the pixel 900P2, as can be seen from a comparison between FIG. 34A described later and FIG. 30A.

Figure 34A:
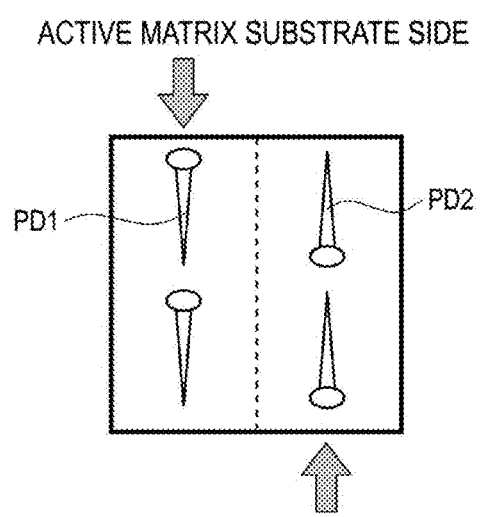
FIG. 34A is a diagram for describing a method for obtaining an alignment division structure of a pixel 900P2.
Figure 34B:
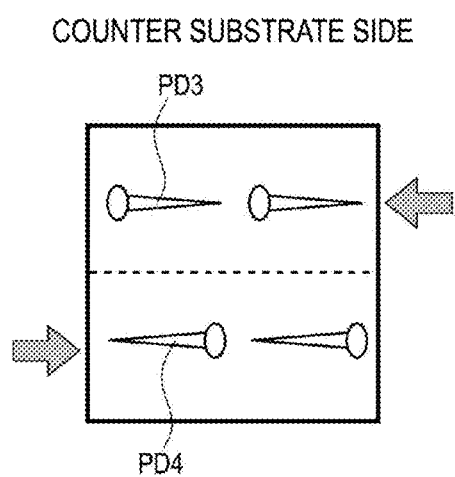
FIG. 34B is a diagram for describing the method for obtaining the alignment division structure of the pixel 900P2.
Figure 34C:
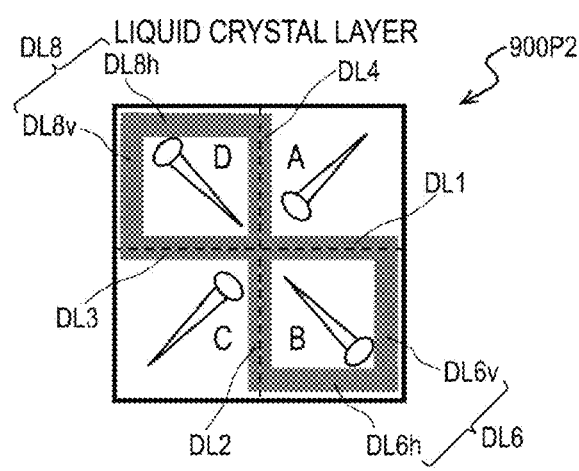
FIG. 34C is a diagram for describing the method for obtaining the alignment division structure of the pixel 900P2.

By bonding an active matrix substrate that has been subjected to an alignment treatment as illustrated in FIG. 34A and a counter substrate that has been subjected to an alignment treatment as illustrated in FIG. 34B, the pixel 900P2 in which the alignment is divided as illustrated in FIG. 34C can be formed.

As illustrated in FIG. 34C, dark lines DL1 to DL4, DL6, and DL8 occur in the pixel 900P2. Among the dark lines DL1 to DL4, DL6, and DL8, the dark lines DL1 to DL4 occur at boundaries between adjacent liquid crystal domains and dark lines DL6 and DL8 occur in the vicinities of edges of the pixel electrode. The dark lines DL6 and DL8 include portions DL6h and DL8h parallel to the horizontal direction and portions DL6v and DL8v parallel to the vertical direction, respectively. The dark lines DL1 to DL4, DL6, and DL8 form a FIG. 8 shape as a whole (more specifically, a FIG. 8 shape inclined relative to the vertical direction).

Figure 35:
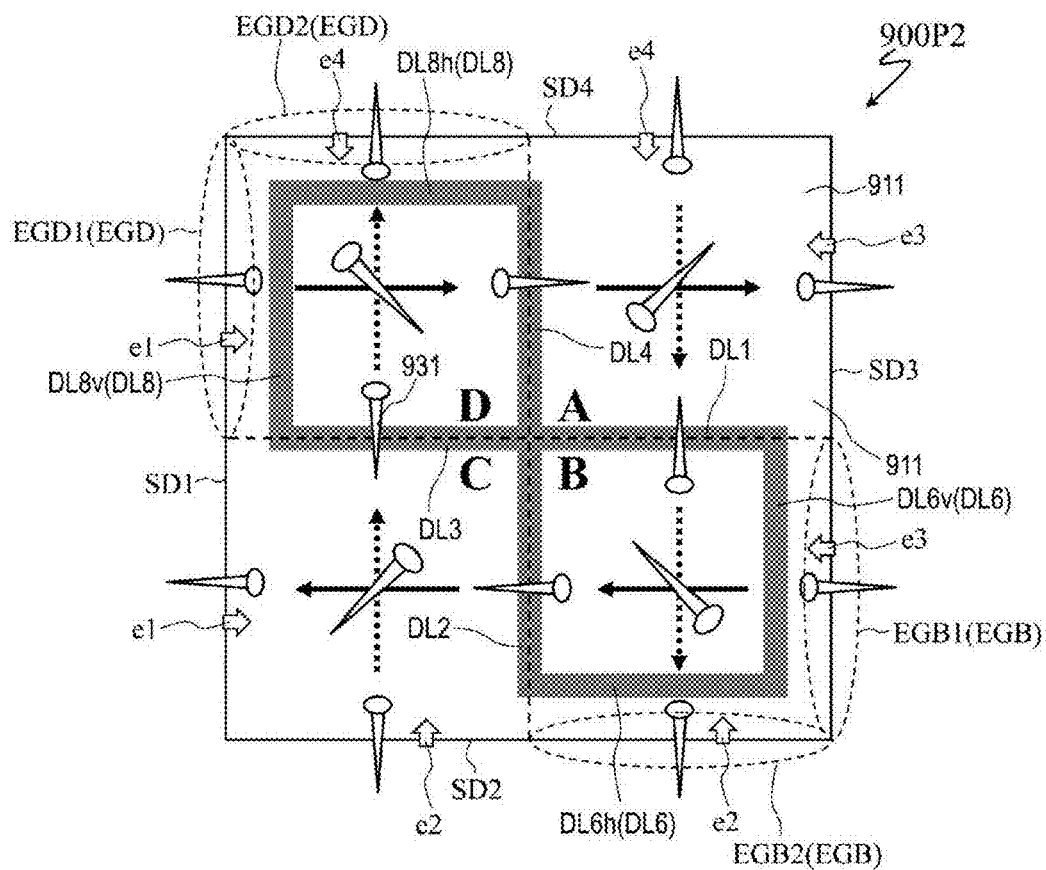
FIG. 35 is a plan view schematically illustrating an alignment state of liquid crystal molecules 931 in the pixel 900P2.

The reason why the dark lines occur to form the FIG. 8 shape will be described below with reference to FIG. 35.

The dark lines DL1 to DL4 occur for the same reason as the dark lines DL1 to DL4 in the pixel 900P1. The dark lines DL6 and DL8 occur for the reason described below.

In the pixel 900P2, an entire portion adjacent to the liquid crystal domain B among the edges of a pixel electrode 911 is an edge portion EGB, and the edge portion EGB includes a first portion EGB1 corresponding to the lower half of a right edge SD3 and a second portion EGB2 corresponding to the right half of a lower edge SD2. In the edge portion EGB, both an azimuth angle direction e3 orthogonal to the first portion EGB1 and toward the inside of the pixel electrode 911 and an azimuth angle direction e2 orthogonal to the second portion EGB2 and toward the inside of the pixel electrode 911 form angles with a tilt direction tb in the liquid crystal domain B of greater than 90° (specifically, approximately 135°). As a result, in the liquid crystal domain B, the dark line DL6 occurs parallel to the edge portion EGB when voltage is applied.

Similarly, an entire portion adjacent to the liquid crystal domain D among the edges of the pixel electrode 911 is an edge portion EGD, and the edge portion EGD includes a first portion EGD1 corresponding to the upper half of a left edge SD1 and a second portion EGD2 corresponding to the left half of an upper edge SD4. In the edge portion EGD, both an azimuth angle direction e1 orthogonal to the first portion EGD1 and toward the inside of the pixel electrode 911 and an azimuth angle direction e4 orthogonal to the second portion EGD2 and toward the inside of the pixel electrode 911 form angles with a tilt direction td in the liquid crystal domain D of greater than 90° (specifically, approximately 135°). As a result, in the liquid crystal domain D, the dark line DL8 occurs parallel to the edge portion EGD when voltage is applied.

On the other hand, portions adjacent to the liquid crystal domain A (the upper half of the edge SD3 and the right half of the edge SD4) among the edges of the pixel electrode 911 do not include edge portions in which the azimuth angle directions e3 and e4 orthogonal thereto and directed toward the inside of the pixel electrode 911 form angles with a tilt direction ta in the liquid crystal domain A of greater than 90°. Specifically, the tilt direction ta in the liquid crystal domain A forms angles of approximately 45° with the azimuth angle directions e3 and e4. Thus, in the liquid crystal domain A, linear dark lines do not occur in the vicinities of the edges of the pixel electrode 911 when voltage is applied.

Similarly, portions adjacent to the liquid crystal domain C (the lower half of the edge SD1 and the left half of the edge SD2) among the edges of the pixel electrode 911 do not include edge portions in which the azimuth angle directions e1 and e2 orthogonal thereto and directed toward the inside of the pixel electrode 911 form angles with a tilt direction tc in the liquid crystal domain C of greater than 90°. Specifically, the tilt direction tc in the liquid crystal domain C forms angles of approximately 45° with the azimuth angle directions e1 and e2. Thus, in the liquid crystal domain C, linear dark lines do not occur in the vicinities of the edges of the pixel electrode 911 when voltage is applied.

The dark lines that occur according to the mechanism described above (dark lines forming a swastika shape or FIG. 8 shape in the example described) can cause a decrease in pixel transmittance. The liquid crystal display device according to the embodiments of the disclosure can reduce the area of dark lines that occur in the pixel by having the configurations described below, thereby improving transmittance.

Hereinafter, embodiments of the disclosure will be described with reference to the accompanying drawings. Note that the disclosure is not limited to the embodiments to be described below.

First Embodiment

Figure 2:
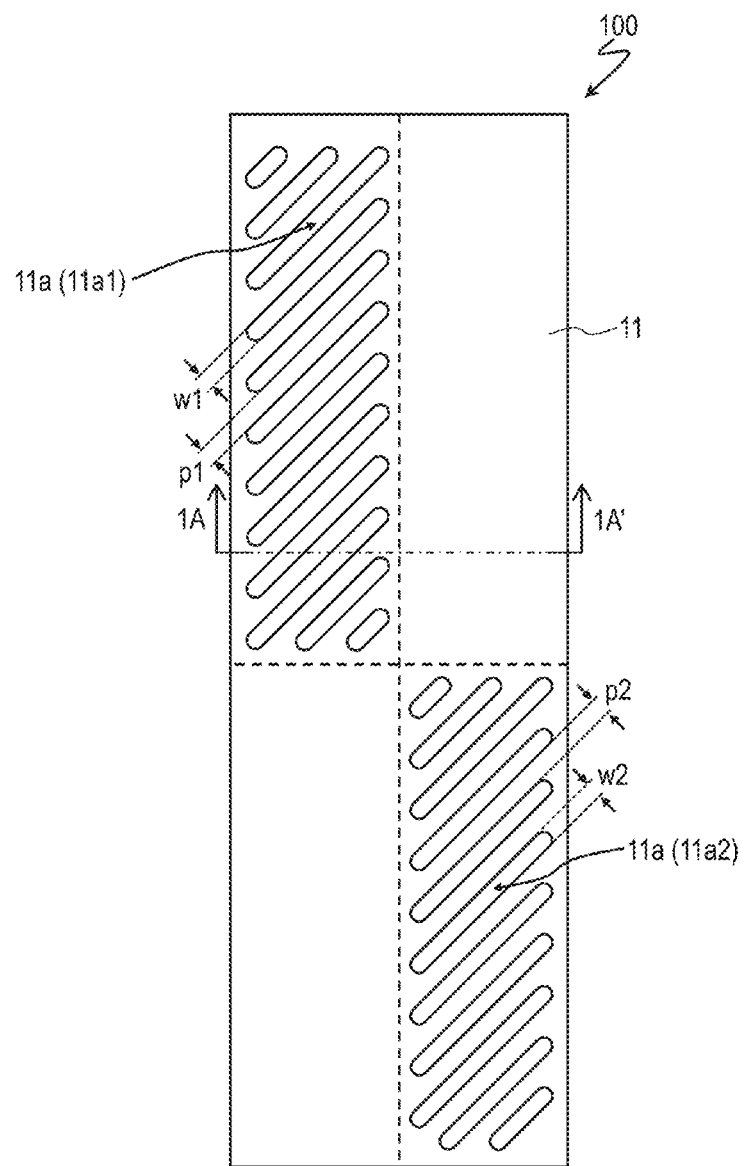
FIG. 2 is a plan view schematically illustrating the liquid crystal display device 100.

A liquid crystal display device 100 according to the present embodiment will be described with reference to FIGS. 1 and 2. FIGS. 1 and 2 are a cross-sectional view and a plan view schematically illustrating the liquid crystal display device 100, respectively. FIG. 1 illustrates a cross section taken along line 1A-1A' in FIG. 2.

As illustrated in FIG. 1, the liquid crystal display device 100 is provided with a liquid crystal display panel 101 and a backlight (illumination device) 102. The liquid crystal display panel 101 includes an active matrix substrate (first substrate) 10 and a counter substrate (second substrate) 20 facing each other, and a vertically aligned liquid crystal layer 30 provided therebetween. The backlight 102 is disposed on a back face side (the side opposite to the viewer) of the liquid crystal display panel 101. The liquid crystal display device 100 also includes a plurality of pixels arranged in a matrix including a plurality of rows and a plurality of columns.

The active matrix substrate 10 includes pixel electrodes 11 provided for a plurality of pixels, respectively, and a first alignment film 12 provided between the pixel electrodes 11 and the liquid crystal layer 30 (i.e., the top surface of the active matrix substrate 10 on the liquid crystal layer 30 side). The counter substrate 20 includes a counter electrode 21 facing the pixel electrodes 11, and a second alignment film 22 provided between the counter electrode 21 and the liquid crystal layer 30 (i.e., the top surface of the counter substrate 20 on the liquid crystal layer 30 side). The pixel electrode 11 and the counter electrode 21 are made of a transparent conductive material (e.g., ITO). The first alignment film 12 and the second alignment film 22 have alignment regulating forces that align the liquid crystal molecules approximately perpendicular to the surfaces thereof.

Configurations of the active matrix substrate 10 and the counter substrate 20 will be described in more detail below.

The pixel electrode 11 and the first alignment film 12 of the active matrix substrate 10 are provided in this order on a surface of a substrate 10a on the liquid crystal layer 30 side. That is, the pixel electrode 11 and the first alignment film 12 are supported by the substrate 10a. The substrate 10a is transparent and has insulating properties. The substrate 10a is, for example, a glass substrate or a plastic substrate.

In the present embodiment, the pixel electrode 11 includes a plurality of slits 11a as illustrated in FIGS. 1 and 2. The plurality of slits 11a are formed only in some regions of the pixel electrode 11 (i.e., not over an entire pixel electrode 11). More specifically, the slits 11a are arranged in regions corresponding to two of four liquid crystal domains formed by the alignment division. In FIG. 2, boundaries between the liquid crystal domains adjacent to each other are indicated by dashed lines. Specific arrangement and the like of the slits 11a will be described in detail later.

Figure 3:
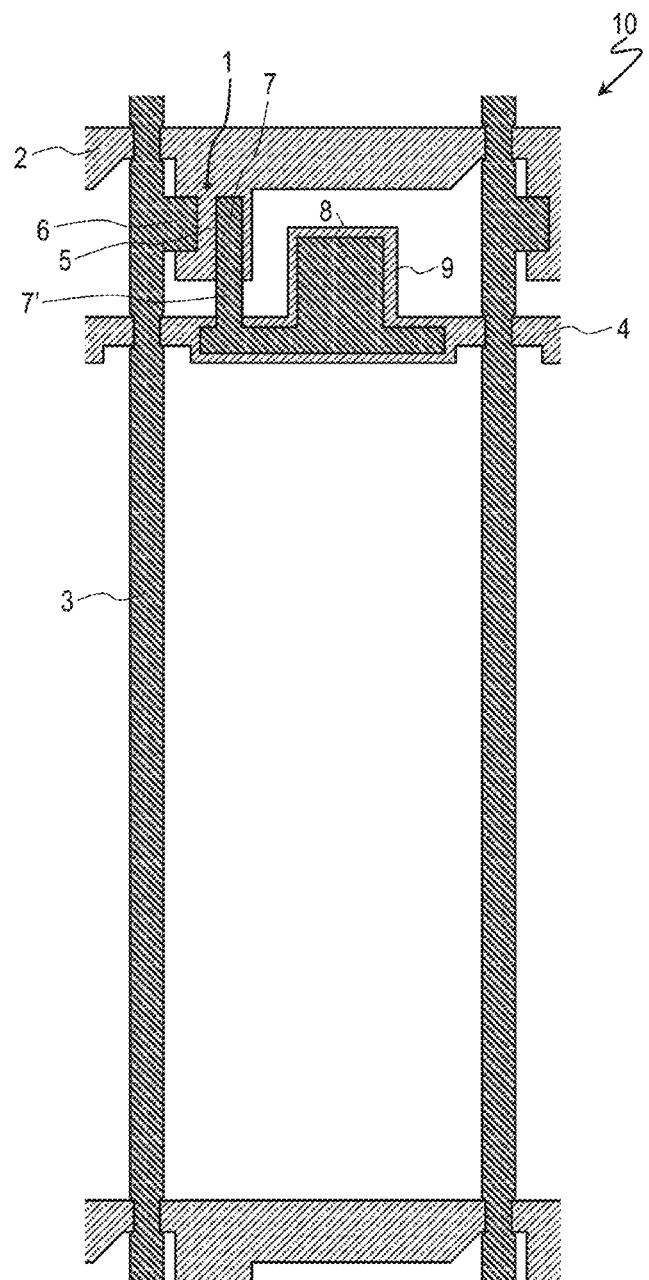
FIG. 3 is a plan view illustrating an example of a wiring structure of an active matrix substrate 10 included in the liquid crystal display device 100.

The active matrix substrate 10 includes, in addition to the pixel electrodes 11 and the first alignment film 12 described above, thin film transistors (TFTs) provided for the respective pixels, scanning wiring lines and signal wiring lines for supplying scanning signals and display signals to the TFTs, and the like. FIG. 3 illustrates an example of a wiring structure of the active matrix substrate 10. FIG. 3 illustrates a wiring structure in a region corresponding to one pixel.

As illustrated in FIG. 3, the active matrix substrate 10 further includes a TFT 1, a scanning wiring line (gate wiring line) 2 extending in a row direction, a signal wiring line (source wiring line) 3 extending in a column direction, and an auxiliary capacitance wiring line 4 extending in the row direction.

The TFT 1 includes a gate electrode 5, a semiconductor layer (not illustrated), a source electrode 6, and a drain electrode 7. The gate electrode 5 is electrically connected to the gate wiring line 2. In the example illustrated in FIG. 3, the gate electrode 5 and the gate wiring line 2 are integrally formed, and a portion of the gate wiring line 2 (a portion overlapping the semiconductor layer with the gate insulating layer (not illustrated) interposed therebetween) functions as the gate electrode 5. The source electrode 6 is electrically connected to the source wiring line 3. In the example illustrated in FIG. 3, the source electrode 6 extends so as to branch from the source wiring line 3. The drain electrode 7 is electrically connected to the pixel electrode 11. In the example illustrated in FIG. 3, a connection portion 7' extends from the drain electrode 7, and the drain electrode 7 and an auxiliary capacitance electrode 8 are connected by the connection portion 7'. The auxiliary capacitance electrode 8 is connected to the pixel electrode 11 through a contact hole formed in an interlayer insulating layer (not illustrated) thereon. Thus, the drain electrode 7 is electrically connected to the pixel electrode 11 via the auxiliary capacitance electrode 8 and the connection portion 7'.

The auxiliary capacitance electrode 8 faces an auxiliary capacitance counter electrode 9 with the gate insulating layer interposed therebetween. The auxiliary capacitance counter electrode 9 is electrically connected to the auxiliary capacitance wiring line 4. In the example illustrated in FIG. 3, the auxiliary capacitance counter electrode 9 is formed integrally with the auxiliary capacitance wiring line 4. More specifically, a portion of the auxiliary capacitance wiring line 4 that is formed to have a larger width than other portions functions as the auxiliary capacitance counter electrode 9. An auxiliary capacity is formed by the auxiliary capacitance electrode 8, the auxiliary capacitance counter electrode 9, and the gate insulating layer located therebetween.

Note that the wiring structure in the active matrix substrate 10 is not limited to the example illustrated in FIG. 3.

As illustrated in FIG. 1, the counter electrode 21 and the second alignment film 22 of the counter substrate 20 are provided in this order on a surface of a substrate 20a on the liquid crystal layer 30 side. That is, the counter electrode 21 and the second alignment film 22 are supported by the substrate 20a. The substrate 20a is transparent and has insulating properties. The substrate 20a is, for example, a glass substrate or a plastic substrate.

Although not illustrated here, the counter substrate 20 includes a color filter layer and a light blocking layer (black matrix) in addition to the counter electrode 21 and the second alignment film 22 described above. The color filter layer typically includes a red color filter, a green color filter, and a blue color filter.

The first alignment film 12 and the second alignment film 22 have alignment regulating forces that align the liquid crystal molecules approximately perpendicular to the surfaces thereof. In the present embodiment, the first alignment film 12 and the second alignment film 22 are subjected to a photo-alignment treatment. That is, each of the first alignment film 12 and the second alignment film 22 is photo-alignment film.

The liquid crystal display device 100 further includes a pair of polarizers 41 and 42 that face each other with the liquid crystal layer 30 interposed therebetween. The pair of polarizers 41 and 42 are arranged so that transmission axes thereof are approximately orthogonal to each other (i.e., in crossed-Nicols).

Next, an alignment division structure of a pixel P1 in the liquid crystal display device 100 according to the present embodiment will be described with reference to FIG. 4.

Figure 4:
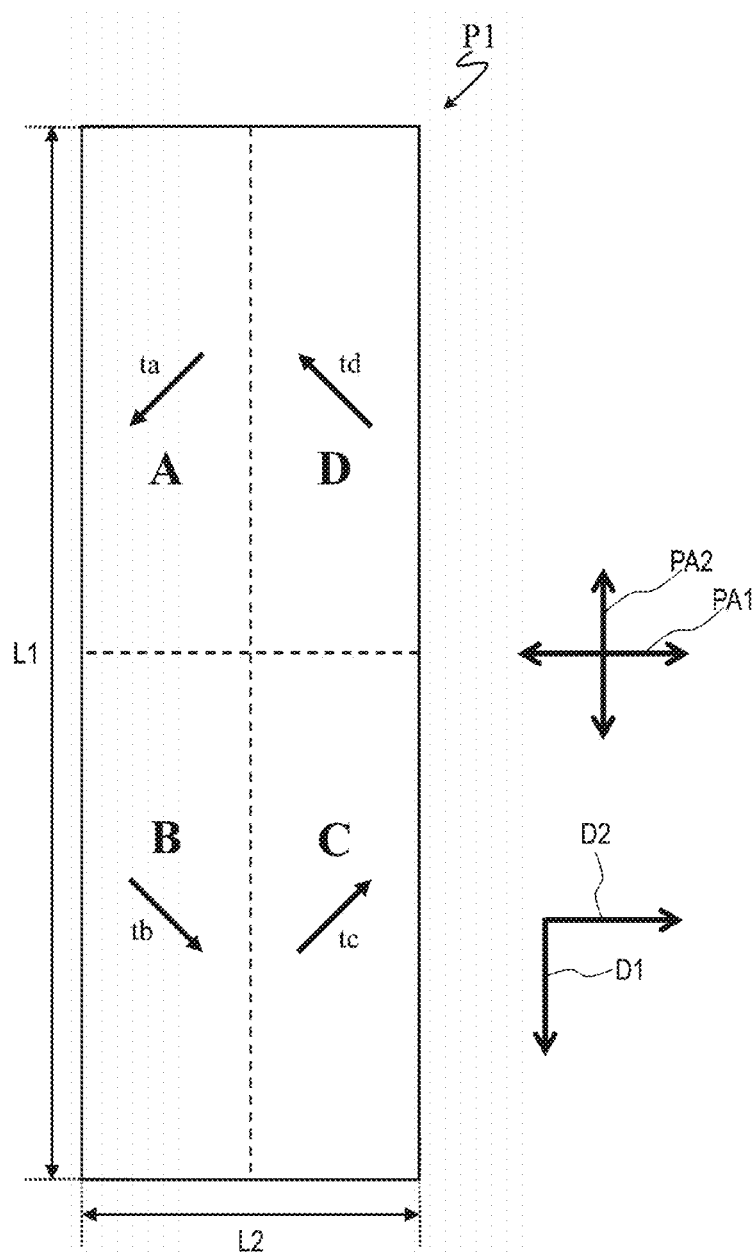
FIG. 4 is a diagram illustrating an alignment division structure of a pixel P1 in the liquid crystal display device 100.

When voltage is applied between the pixel electrode 11 and the counter electrode 21, in each pixel P1, four liquid crystal domains A, B, C, and D are formed in the liquid crystal layer 30 as illustrated in FIG. 4. The four liquid crystal domains A, B, C and D are each adjacent to other liquid crystal domains, and arranged in a matrix of two rows and two columns. Azimuthal directions of four directors (reference alignment directions) ta, tb, tc, and td, which represent the alignment directions of the liquid crystal molecules contained in the liquid crystal domains A, B, C, and D, respectively, are different from each other.

When a horizontal azimuth angle (3 o'clock direction) on the display surface is 0°, an azimuthal direction of the director ta in the liquid crystal domain A is an approximately 225° direction, an azimuthal direction of the director tb in the liquid crystal domain B is an approximately 315° direction, an azimuthal direction of the director tc in the liquid crystal domain C is an approximately 45° direction, and an azimuthal direction of the director td in the liquid crystal domain D is an approximately 135° direction. That is, the difference between any two of the four azimuthal directions of the four directors in the liquid crystal domains A, B, C, and D is approximately equal to an integer multiple of 90°. In addition, the liquid crystal domains A, B, C, and D are arranged such that the azimuthal directions of the directors differ by approximately 90° between adjacent liquid crystal domains in the row direction and between adjacent liquid crystal domains in the column direction.

One of transmission axes (polarization axes) PA1 and PA2 of the pair of polarizers 41 and 42 is parallel to the horizontal direction of the display surface, and another is parallel to the vertical direction of the display surface. Thus, the transmission axes PA1 and PA2 of the polarizers 41 and 42 form angles of approximately 45° with the azimuthal directions of the directors ta, tb, tc, and td in the liquid crystal domains A, B, C, and D.

Note that FIG. 4 illustrates an example in which areas of the four liquid crystal domains A, B, C, and D in the pixel P1 are equal to each other, but the areas of the four liquid crystal domains A, B, C, and D are not necessarily equal to each other. However, from the viewpoint of uniformity of viewing angle characteristics, it is preferable that the difference in area between the four liquid crystal domains A, B, C and D be as small as possible. The example illustrated in FIG. 4 is the most preferable (i.e., ideal) example of a four-domain structure in terms of viewing angle characteristics.

In the example illustrated in FIG. 4, each pixel P1 has an approximately rectangular shape in which a longitudinal direction D1 and a traverse direction D2 are defined. Hereinafter, the longitudinal direction D1 and the traverse direction D2 of the pixel P1 may be referred to as a "pixel longitudinal direction D1" and a "pixel traverse direction D2", respectively. The ratio of a length L1 of the pixel P1 along the pixel longitudinal direction D1 to a length L2 of the pixel P1 along the pixel traverse direction D2 is, for example, 3:1, but is not limited thereto.

Figure 5A:
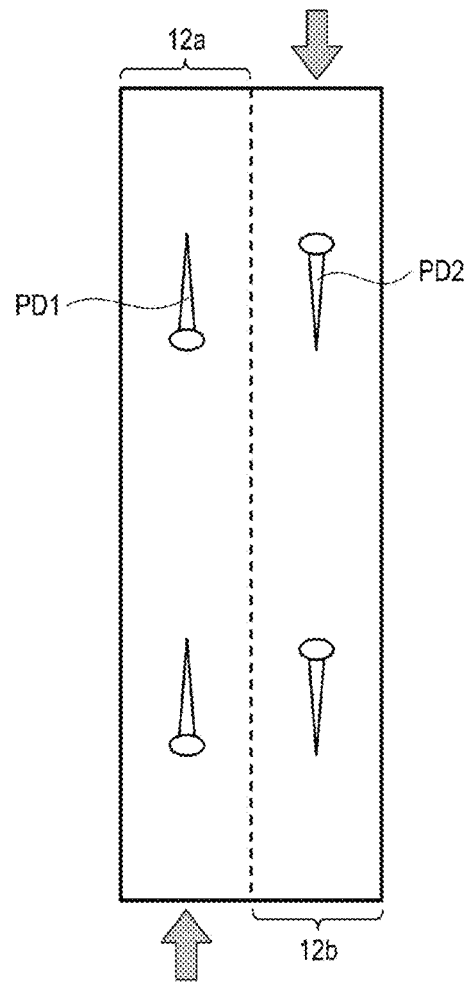
FIG. 5A is a diagram for describing a method for obtaining the alignment division structure of the pixel P1.
Figure 5B:
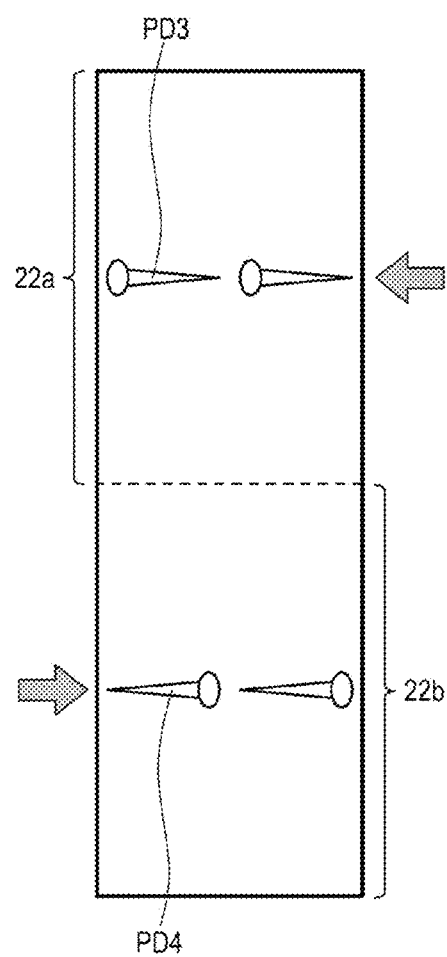
FIG. 5B is a diagram for describing the method for obtaining the alignment division structure of the pixel P1.
Figure 5C:
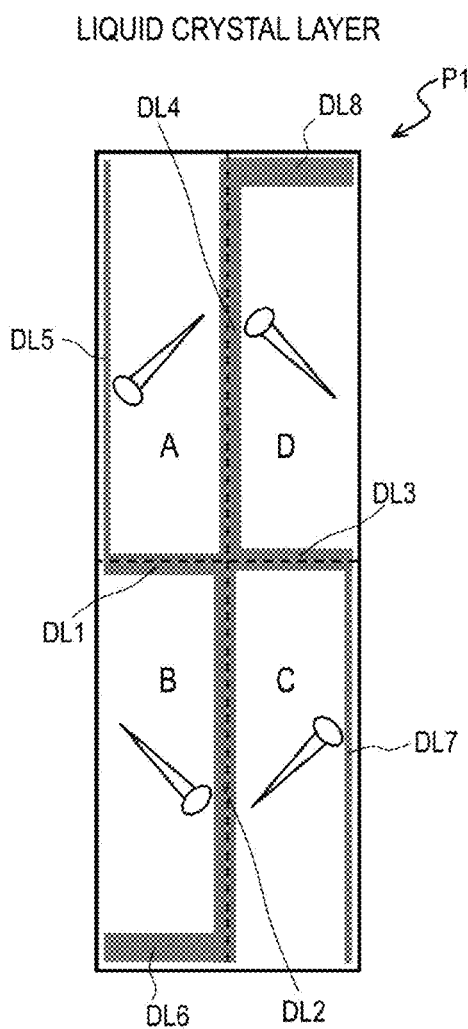
FIG. 5C is a diagram for describing the method for obtaining the alignment division structure of the pixel P1.

Next, an alignment division method for obtaining the alignment division structure of the pixel P1 will be described with reference to FIGS. 5A, 5B, and 5C. FIG. 5A illustrates pretilt directions PD1 and PD2 defined by the first alignment film 12 provided in the active matrix substrate 10, and FIG. 5B illustrates pretilt directions PD3 and PD4 defined by the second alignment film 22 provided in the counter substrate 20. FIG. 5C illustrates tilt directions (directors) when voltage is applied to the liquid crystal layer 30 after bonding the active matrix substrate 10 and the counter substrate 20 together.

As illustrated in FIG. 5A, in each pixel P1, the first alignment film 12 has a first pretilt region 12a that defines the first pretilt direction PD1 and a second pretilt region 12b that defines the second pretilt direction PD2 that is antiparallel to the first pretilt direction PD1. Specifically, the region of the first alignment film 12 corresponding to one pixel P1 is divided into two regions on the right and left, and the photo-alignment treatment is performed so that the two regions (first pretilt region and second pretilt region) 12a and 12b define the pretilt directions (first pretilt direction and second pretilt direction) PD1 and PD2, which are antiparallel to each other. Here, the photo-alignment treatment is performed by obliquely irradiating ultraviolet rays (e.g., linearly polarized ultraviolet rays) from the directions indicated by arrows.

As illustrated in FIG. 5B, in the pixel P1, the second alignment film 22 has a third pretilt region 22a that defines the third pretilt direction PD3 that is approximately orthogonal to the first pretilt direction PD1 and the second pretilt direction PD2, and a fourth pretilt region 22b that defines the fourth pretilt direction PD4 that is antiparallel to the third pretilt direction PD3. Specifically, the region of the second alignment film 22 corresponding to one pixel P1 is divided into two regions, upper and lower, and the photo-alignment treatment is performed so that the two regions (third pretilt region and fourth pretilt region) 22a and 22b define the pretilt directions (third pretilt direction and fourth pretilt direction) PD3 and PD4, which are antiparallel to each other. Here, the photo-alignment treatment is performed by obliquely irradiating ultraviolet rays (e.g., linearly polarized ultraviolet rays) from the directions indicated by arrows.

By bonding the active matrix substrate 10 and the counter substrate 20 that have been subjected to the photo-alignment treatment as illustrated in FIGS. 5A and 5B, the pixel P1 in which the alignment is divided as illustrated in FIG. 5C can be formed. For each of the liquid crystal domains A to D, the pretilt direction defined by the first alignment film 12 on the active matrix substrate 10 side and the pretilt direction defined by the second alignment film 22 on the counter substrate 20 side are different from each other by approximately 90°, and the tilt direction (reference alignment direction) is defined by these two pretilt directions. As can be seen from FIG. 5C, the tilt direction is defined in the middle direction of the pin directions corresponding to the two pretilt directions. A boundary between the first pretilt region 12a and second pretilt region 12b, and a boundary between the third pretilt region 22a and fourth pretilt region 22b are boundaries (domain boundaries) between adjacent liquid crystal domains among the four liquid crystal domains A, B, C, and D.

Dark lines DL1 to DL8 occur in the pixel P1 having the alignment division structure. Specifically, the dark lines DL1 to DL4 occur at the boundaries between adjacent liquid crystal domains, and the dark lines DL5 to DL8 occur in the vicinities of edges of the pixel electrode 11. The dark lines DL1 to DL8 form a swastika shape (more specifically, a right swastika shape) as a whole. In the liquid crystal display device 100 according to the present embodiment, the total area of the dark lines DL1 to DL8 can be reduced, thereby improving transmittance. The reasons for this will be described below.

Figure 6:
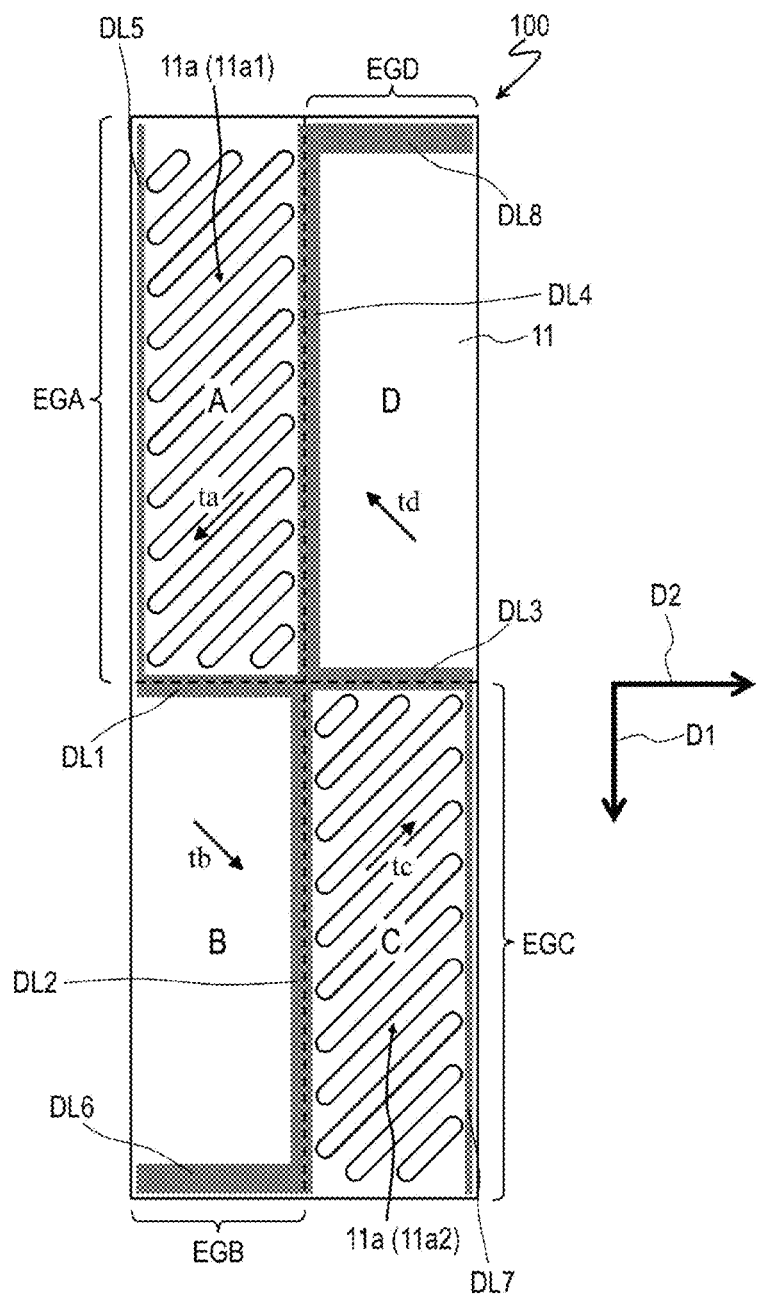
FIG. 6 is a plan view schematically illustrating the liquid crystal display device 100.

As illustrated in FIG. 6, the pixel electrode 11 has four edge portions EGA, EGB, EGC, and EGD at which the dark lines DL5 to DL8 may occur in the vicinities thereof. Among the four edge portions EGA, EGB, EGC, and EGD, the edge portion EGA adjacent to the liquid crystal domain A and the edge portion EGC adjacent to the liquid crystal domain C each extend approximately parallel to the pixel longitudinal direction D1. The edge portion EGB adjacent to the liquid crystal domain B and the edge portion EGD adjacent to the liquid crystal domain D each extend approximately parallel to the pixel traverse direction D2. Thus, each of the edge portions EGA and EGC is longer than each of the edge portions EGB and EGD.

The pixel electrode 11 has a plurality of first slits 11a1 formed in a region corresponding to the liquid crystal domain A and a plurality of second slits 11a2 formed in a region corresponding to the liquid crystal domain C. The plurality of first slits 11a1 extend approximately parallel to the reference alignment direction ta in the liquid crystal domain A, and are arranged over substantially an entire region corresponding to the liquid crystal domain A. The plurality of second slits 11a2 extend approximately parallel to the reference alignment direction tc in the liquid crystal domain C, and are arranged over substantially an entire region corresponding to the liquid crystal domain C. The reference alignment direction ta in the liquid crystal domain A and the reference alignment direction tc in the liquid crystal domain C form an angle of approximately 180°. The liquid crystal domain A and the liquid crystal domain C are adjacent to each other in an oblique direction, which is inclined in the row direction and the column direction.

In the region corresponding to the liquid crystal domain A, the first slits 11a1 that extend approximately parallel to the reference alignment direction ta are formed, so that the number of liquid crystal molecules aligned approximately parallel to the reference alignment direction ta is large (existence probability is higher). Thus, an area of the dark line DL5 in the vicinity of the edge portion EGA, an area of the dark line DL1 at a boundary between the liquid crystal domain A and the liquid crystal domain B, and an area of the dark line DL4 at a boundary between the liquid crystal domain A and the liquid crystal domain D are reduced. Also, in the region corresponding to the liquid crystal domain C, the second slits 11a2 that extend approximately parallel to the reference alignment direction tc are formed, so that the number of liquid crystal molecules aligned approximately parallel to the reference alignment direction tc is large (existence probability is higher). Thus, an area of the dark line DL7 in the vicinity of the edge portion EGC, an area of the dark line DL3 at a boundary between the liquid crystal domain C and the liquid crystal domain D, and an area of the dark line DL2 at a boundary between the liquid crystal domain C and the liquid crystal domain B are reduced.

As illustrated in FIG. 6, the pixel electrode 11 does not have slits in a region corresponding to the liquid crystal domain B and a region corresponding to the liquid crystal domain D. When slits are also formed in the region corresponding to the liquid crystal domain B and the region corresponding to the liquid crystal domain D, areas of the dark lines DL6 and DL8 that occur in the vicinities of the edge portions EGB and EGD can also be reduced. However, according to the study of the inventors, it has been found that when the slits are arranged over substantially an entire region corresponding to the liquid crystal domain B and substantially an entire region corresponding to the liquid crystal domain D, transmission loss due to the slits is large, and transmittance may rather decrease. In addition, it has been found that the width of the slit varies in a process of forming the slits, which may cause unevenness and reduce the yield.

In the liquid crystal display device 100 according to the present embodiment, the slits 11a are formed in the regions where the relatively long edge portions EGA and EGC exist and the relatively long dark lines DL5 and DL7 occur (i.e., the region corresponding to the liquid crystal domain A and the region corresponding to the liquid crystal domain C), and the slits 11a are not formed in the regions where the relatively short edge portions EGB and EGD exist and the relatively short dark lines DL6 and DL8 occur (i.e., the region corresponding to the liquid crystal domain B and the region corresponding to the liquid crystal domain D). This reduces the areas of the relatively long dark lines DL5 and DL7 and suppresses transmission loss due to the slits 11a, thereby increasing the effect of improving the transmittance of the pixel P1 as a whole. In addition, since the region where the slits 11a are formed is not the entire pixel P1 but part of the pixel P1, the occurrence of unevenness due to variations in the width of the slit 11a is suppressed, thereby improving productivity (yield).

Results of verifying the effect of improving transmittance by alignment simulation will be described below. Dedicated liquid crystal simulator software was used for the simulation.

Figure 7A:
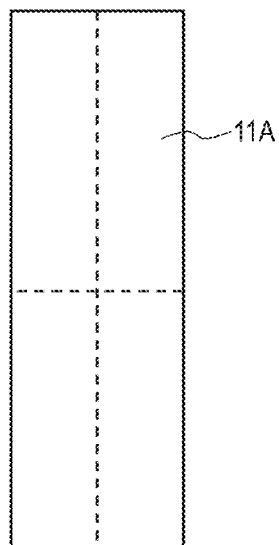
FIG. 7A is a diagram illustrating a pixel electrode 11A of Comparative Example 1.
Figure 7B:
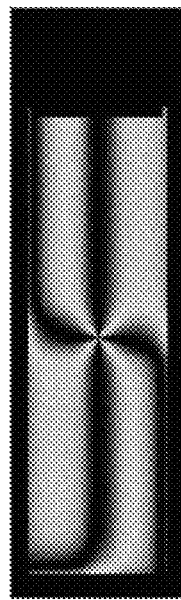
FIG. 7B is a diagram illustrating a result obtained by simulating a transmittance distribution in a pixel during white display in Comparative Example 1.
Figure 8A:
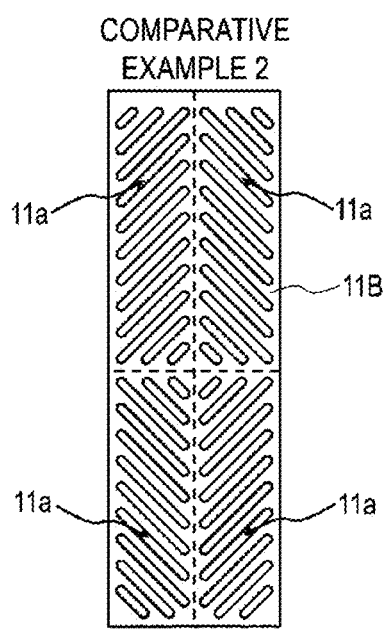
FIG. 8A is a diagram illustrating a pixel electrode 11B of Comparative Example 2.
Figure 8B:
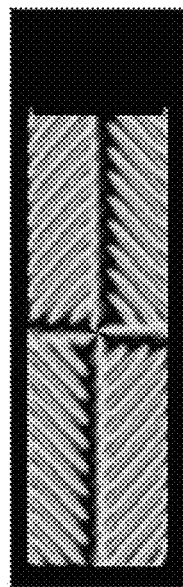
FIG. 8B is a diagram illustrating a result obtained by simulating a transmittance distribution in a pixel during white display in Comparative Example 2.
Figure 9:
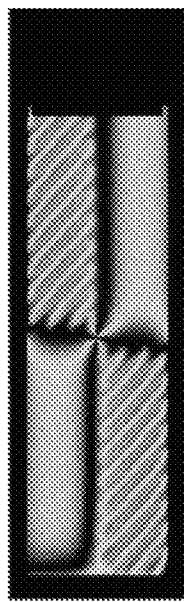
FIG. 9 is a diagram illustrating a result obtained by simulating a transmittance distribution in a pixel during white display in Example 1.

FIG. 7B illustrates a verification result when no slits are formed in a pixel electrode 11A as illustrated in FIG. 7A (Comparative Example 1), and FIG. 8B illustrates a verification result when the slits 11a are formed in an entire pixel electrode 11B (i.e., not only in the regions corresponding to the liquid crystal domains A and C, but also in the regions corresponding to the liquid crystal domains B and D) as illustrated in FIG. 8A (Comparative Example 2). FIG. 9 illustrates a verification result when the slits 11a are formed in part of the pixel electrode 11 (i.e., only in the regions corresponding to the liquid crystal domains A and C), as in the present embodiment (Example 1). FIGS. 7B, 8B, and 9 illustrate the results obtained by simulation of transmittance distributions in pixels during white display.

From a comparison between FIGS. 7B and 8B, and a comparison between FIGS. 7B and 9, it can be seen that the area of the dark lines is smaller in Comparative Example 2 and Example 1 than in Comparative Example 1. However, the effect of improving transmittance was higher in Example 1 than in Comparative Example 2. While the transmittance of Comparative Example 1 was 3.91%, the transmittance of Comparative Example 2 was 4.17%, and the transmittance of Example 1 was 4.30%. From the above verification results, it was confirmed that the effect of improving transmittance can be enhanced by adopting the configuration of the present embodiment.

As described above, according to the embodiment of the disclosure, the transmittance of the VAIN mode liquid crystal display device can be improved.

A width w1 of the first slit 11a1 and a width w2 of the second slit 11a2 (see FIG. 2 for both) are not limited, but are preferably, for example, 2.5 μm or more and 4 μm or less.

A distance p1 between two adjacent first slits 11a1 and a distance p2 between two adjacent second slits 11a2 (see FIG. 2 for both) are not limited, but preferably not too large from the viewpoint of increasing the numbers of liquid crystal molecules aligned approximately parallel to the reference alignment directions in the corresponding liquid crystal domains (increasing the existence probability). The distances p1 and p2 are preferably, for example, approximately the same as the width w1 of the first slit 11a1 and the width w2 of the second slit 11a2, and specifically, preferably 2 μm or more and 3 μm or less.

The directions in which the first slit 11a1 and the second slit 11a2 extend need not be strictly parallel to the reference alignment directions in the corresponding liquid crystal domains. The first slit 11a1 and the second slit 11a2 only need to be able to improve transmittance substantially the same as when the first slit 11a1 and the second slit 11a2 extend parallel to the reference alignment directions. For example, the directions in which the first slit 11a1 and the second slit 11a2 extend may form angles of 5° or less with the reference alignment directions in the corresponding liquid crystal domains.

Note that the numbers of the first slits 11a1 and the second slits 11a2 are not limited to the numbers illustrated in the figure.

Second Embodiment

Figure 10:
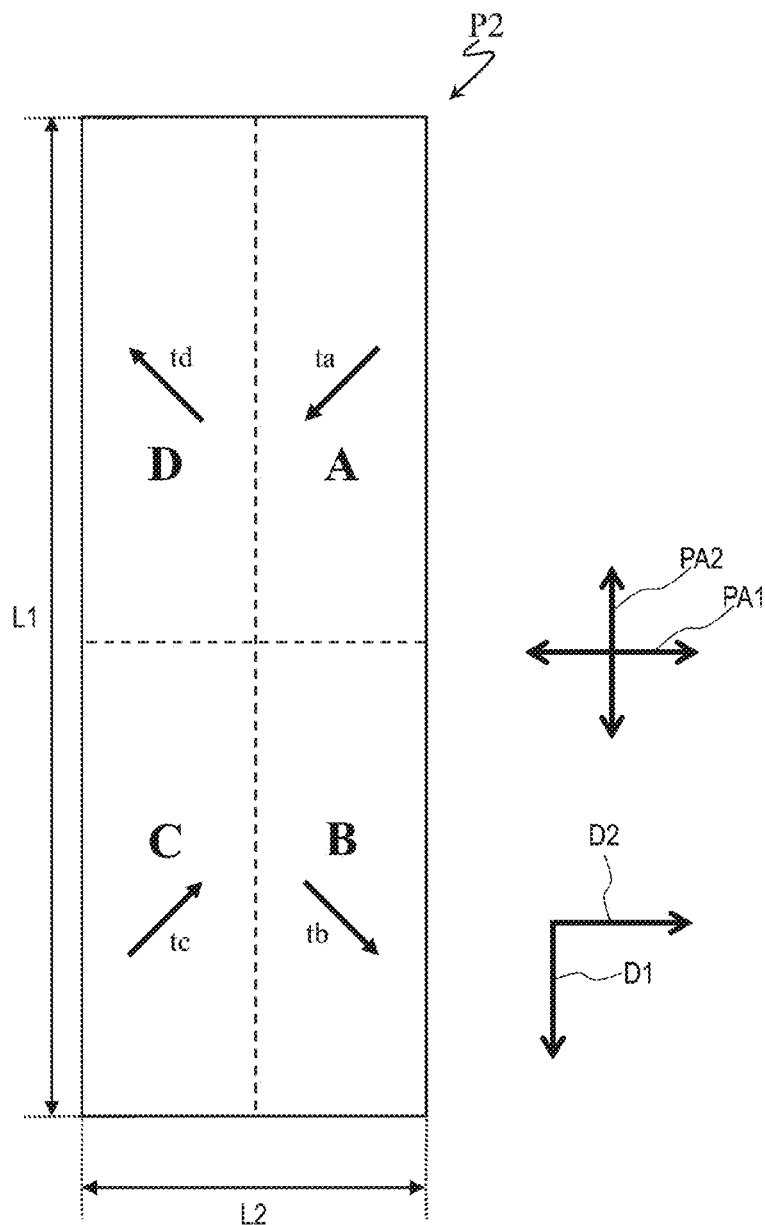
FIG. 10 is a diagram illustrating an alignment division structure of a pixel P2 in another liquid crystal display device 200 according to an embodiment of the disclosure.
Figure 11:
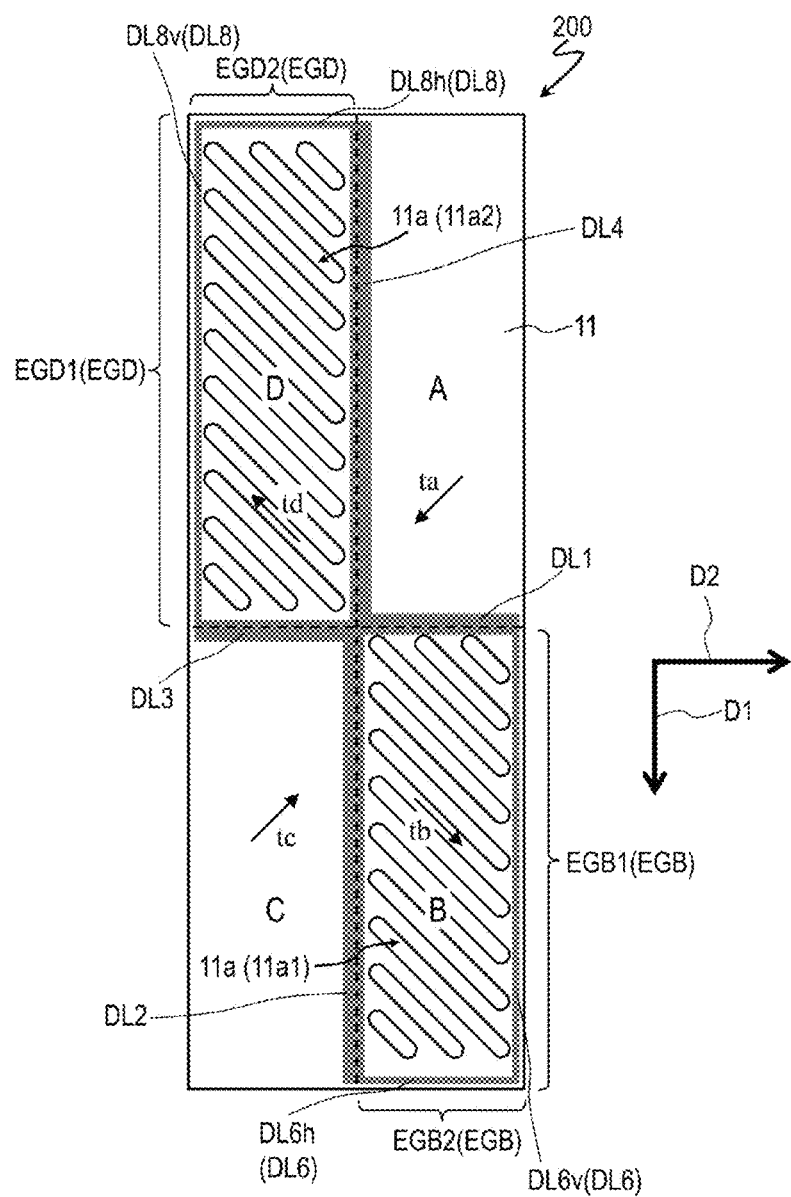
FIG. 11 is a plan view schematically illustrating the liquid crystal display device 200.

A liquid crystal display device 200 of the present embodiment will be described with reference to FIG. 10 and FIG. 11. FIG. 10 is a diagram illustrating an alignment division structure of a pixel P2 in the liquid crystal display device 200. FIG. 11 is a plan view schematically illustrating the liquid crystal display device 200. The following description will primarily focus on differences between the liquid crystal display device 200 and the liquid crystal display device 100 of the first embodiment. Among constituent elements of the liquid crystal display device 200, constituent elements having the same functions as the constituent elements of the liquid crystal display device 100 are denoted by the same reference signs, and descriptions thereof are omitted (the same applies in subsequent embodiments).

As illustrated in FIG. 10, four liquid crystal domains A to D arranged in a matrix of two rows and two columns are formed in each pixel P2 of the liquid crystal display device 200. Azimuthal directions of directors ta to td in the liquid crystal domains A to D in the pixel P2 illustrated in FIG. 10 are the same as the azimuthal directions of the directors ta to td in the liquid crystal domains A to D in the pixel P1 illustrated in FIG. 4. However, in the pixel P1, the liquid crystal domains A to D are arranged in the order of upper left, lower left, lower right, and upper right (i.e., counter-clockwise from the upper left), whereas in the pixel P2, the liquid crystal domains A to D are arranged in the order of upper right, lower right, lower left, and upper left (i.e., clockwise from the upper right). This is because, the pretilt directions are opposite for the left region and right region of the active matrix substrate for the pixel P1 and the pixel P2, as can be seen from a comparison between FIG. 12A described later and FIG. 5A.

In the example illustrated in FIG. 10, each pixel P2 has an approximately rectangular shape in which a pixel longitudinal direction D1 and a pixel traverse direction D2 are defined. The ratio of a length L1 of the pixel P2 along the pixel longitudinal direction D1 to a length L2 of the pixel P2 along the pixel traverse direction D2 is, for example, 3:1, but is not limited thereto.

Figure 12A:
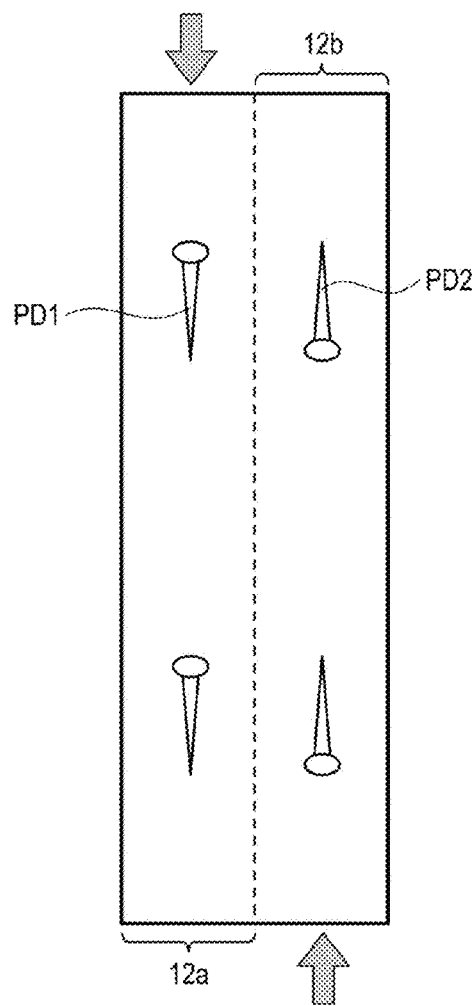
FIG. 12A is a diagram for describing a method for obtaining the alignment division structure of the pixel P2.
Figure 12B:
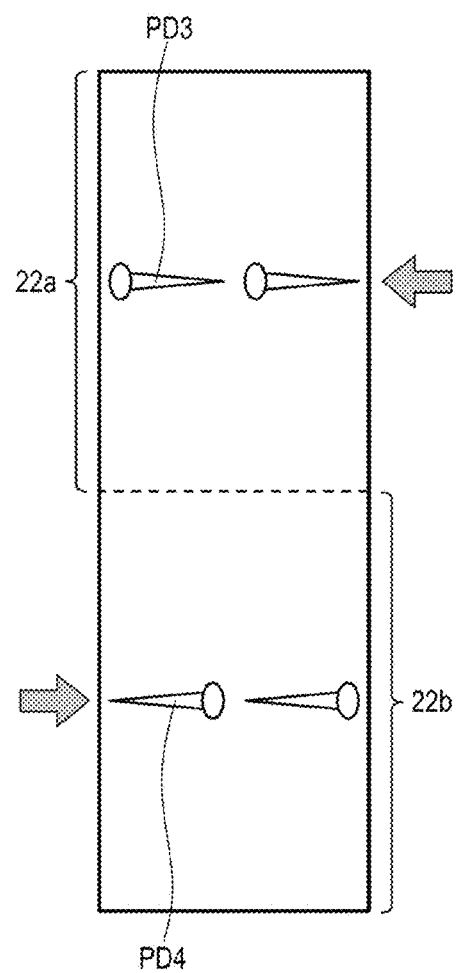
FIG. 12B is a diagram for describing the method for obtaining the alignment division structure of the pixel P2.
Figure 12C:
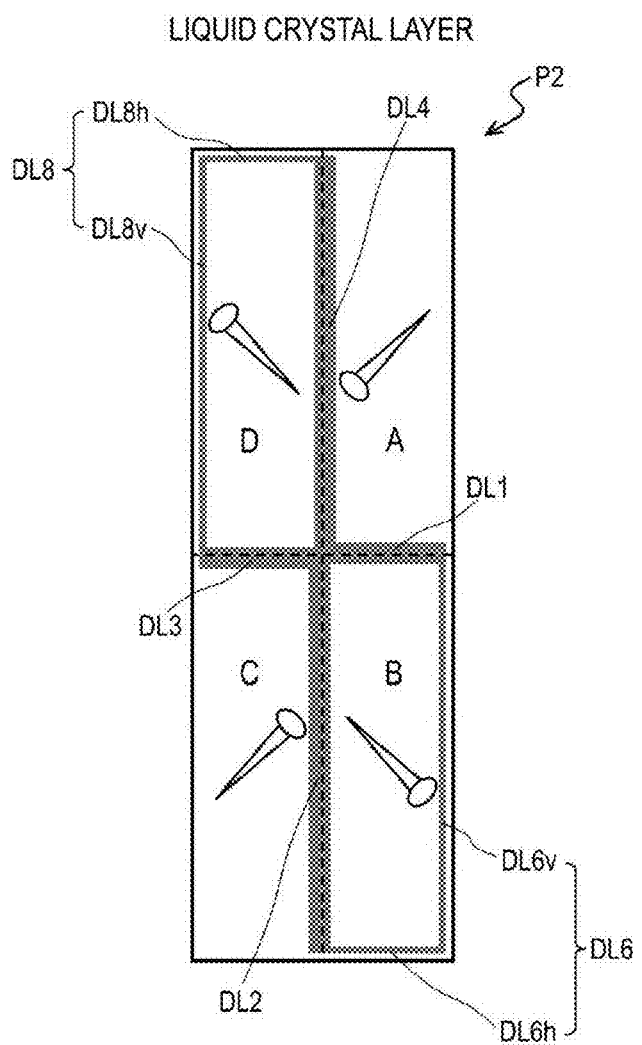
FIG. 12C is a diagram for describing the method for obtaining the alignment division structure of the pixel P2.

By bonding an active matrix substrate that has been subjected to an alignment treatment as illustrated in FIG. 12A and a counter substrate that has been subjected to an alignment treatment as illustrated in FIG. 12B, the pixel P2 in which the alignment is divided as illustrated in FIG. 12C can be formed.

Dark lines DL1 to DL4, DL6, and DL8 occur in the pixel P2. Specifically, the dark lines DL1 to DL4 occur at the boundaries between adjacent liquid crystal domains, and the dark lines DL6 and DL8 occur in the vicinities of edges of a pixel electrode 11. The dark lines DL6 and DL8 include portions DL6h and DL8h parallel to the horizontal direction and portions DL6v and DL8v parallel to the vertical direction, respectively. The dark lines DL1 to DL4, DL6, and DL8 form a FIG. 8 shape as a whole (more specifically, a FIG. 8 shape inclined relative to the vertical direction). In the liquid crystal display device 200 according to the present embodiment, the total area of the dark lines DL1 to DL4, DL6, and DL8 can be reduced, thereby improving transmittance. The reasons for this will be described below.

The pixel electrode 11 of the liquid crystal display device 200 has a plurality of slits 11a, as illustrated in FIG. 11. The plurality of slits 11a are formed only in some regions of the pixel electrode 11 (i.e., not over an entire pixel electrode 11). More specifically, the slits 11a are arranged in regions corresponding to the two liquid crystal domains B and D among the four liquid crystal domains A to D formed by alignment division.

The pixel electrode 11 has two edge portions EGB and EGD at which the dark lines DL6 and DL8 may occur in the vicinities thereof. Of the two edge portions EGB and EGD, the edge portion EGB adjacent to the liquid crystal domain B includes a portion EGB1 extending approximately parallel to the pixel longitudinal direction D1 and the column direction, and a portion EGB2 extending approximately parallel to the pixel traverse direction D2 and the row direction. The edge portion EGD adjacent to the liquid crystal domain D includes a portion EGD1 extending approximately parallel to the pixel longitudinal direction D1 and the column direction, and a portion EGD2 extending approximately parallel to the pixel traverse direction D2 and the row direction. The pixel electrode 11 does not include edge portions where dark lines occur in the vicinities thereof in the regions corresponding to the liquid crystal domains A and C.

The pixel electrode 11 has a plurality of first slits 11a1 formed in a region corresponding to the liquid crystal domain B and a plurality of second slits 11a2 formed in a region corresponding to the liquid crystal domain D. The plurality of first slits 11a1 extend approximately parallel to the reference alignment direction tb in the liquid crystal domain B, and are arranged over substantially an entire region corresponding to the liquid crystal domain B. The plurality of second slits 11a2 extend approximately parallel to the reference alignment direction td in the liquid crystal domain D, and are arranged over approximately an entire region corresponding to the liquid crystal domain D. The reference alignment direction tb in the liquid crystal domain B and the reference alignment direction td in the liquid crystal domain D form an angle of approximately 180°. The liquid crystal domain B and the liquid crystal domain D are adjacent to each other in an oblique direction, which is inclined in the row direction and the column direction.

In the region corresponding to the liquid crystal domain B, the first slits 11a1 that extend approximately parallel to the reference alignment direction tb are formed, so that the number of liquid crystal molecules aligned approximately parallel to the reference alignment direction tb is large (existence probability is higher). Thus, an area of the dark line DL6 in the vicinity of the edge portion EGB, an area of the dark line DL1 at a boundary between the liquid crystal domain B and the liquid crystal domain A, and an area of the dark line DL2 at a boundary between the liquid crystal domain B and the liquid crystal domain C are reduced. Also, in the region corresponding to the liquid crystal domain D, the second slits 11a2 that extend approximately parallel to the reference alignment direction td are formed, so that the number of liquid crystal molecules aligned approximately parallel to the reference alignment direction td is large (existence probability is higher). Thus, an area of the dark line DL8 in the vicinity of the edge portion EGD, an area of the dark line DL3 at a boundary between the liquid crystal domain D and the liquid crystal domain C, and an area of the dark line DL4 at a boundary between the liquid crystal domain D and the liquid crystal domain A are reduced.

As illustrated in FIG. 11, the pixel electrode 11 does not have slits in a region corresponding to the liquid crystal domain A and a region corresponding to the liquid crystal domain C. Thus, in the liquid crystal display device 200 according to the present embodiment, the slits 11a are formed in the regions where the edge portions EGB and EGD at which the dark lines DL6 and DL8 occur in the vicinities thereof exist (i.e., the region corresponding to the liquid crystal domain B and the region corresponding to the liquid crystal domain D), and the slits 11a are not formed in the regions where no edge portions at which the dark lines occur in the vicinities thereof exist (i.e., the region corresponding to the liquid crystal domain A and the region corresponding to the liquid crystal domain C). This reduces the areas of the dark lines DL6 and DL8, and suppresses transmission loss due to the slits 11a, thereby increasing the effect of improving the transmittance of the pixel P2 as a whole. In addition, since the region where the slits 11a are formed is not the entire pixel P2, but part of the pixel P2, the occurrence of unevenness due to variations in the width of the slit 11a is suppressed, thereby improving productivity (yield).

Results of verifying the effect of improving transmittance by alignment simulation will be described below.

Figure 13A:
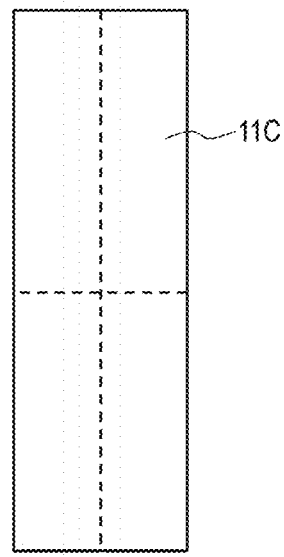
FIG. 13A is a diagram illustrating a pixel electrode 11C of Comparative Example 3.
Figure 13B:
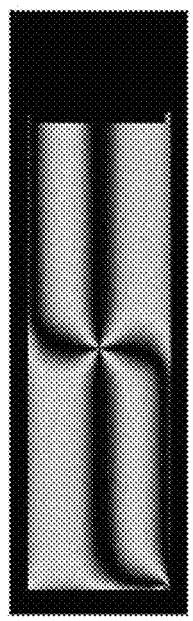
FIG. 13B is a diagram illustrating a result obtained by simulating a transmittance distribution in a pixel during white display in Comparative Example 3.
Figure 14A:
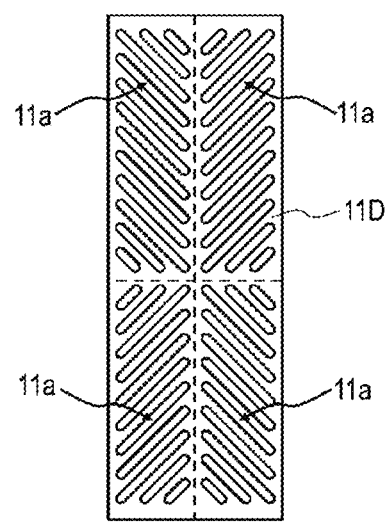
FIG. 14A is a diagram illustrating a pixel electrode 11D of Comparative Example 4.
Figure 14B:
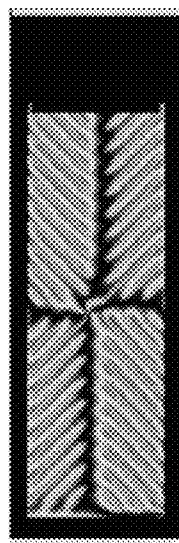
FIG. 14B is a diagram illustrating a result obtained by simulating a transmittance distribution in a pixel during white display in Comparative Example 4.
Figure 15:
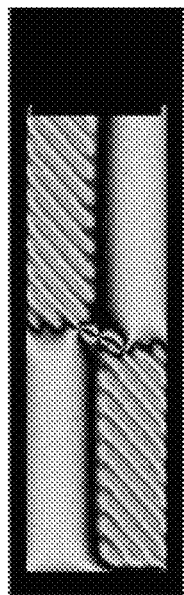
FIG. 15 is a diagram illustrating a result obtained by simulating a transmittance distribution in a pixel during white display in Example 2.

FIG. 13B illustrates a verification result when no slits are formed in a pixel electrode 11C as illustrated in FIG. 13A (Comparative Example 3), and FIG. 14B illustrates a verification result when the slits 11a are formed in an entire pixel electrode 11D (i.e., not only in the regions corresponding to the liquid crystal domains B and D, but also in the regions corresponding to the liquid crystal domains A and C) as illustrated in FIG. 14A (Comparative Example 4). FIG. 15 illustrates a verification result when the slits 11a are formed in part of the pixel electrode 11 (i.e., only in the regions corresponding to the liquid crystal domains B and D), as in the present embodiment (Example 2). FIGS. 13B, 14B, and 15 illustrate the results obtained by simulation of transmittance distributions in pixels during white display.

From a comparison between FIG. 13B and FIG. 14B, and a comparison between FIGS. 13B and 15, it can be seen that the area of the dark lines is smaller in Comparative Example 4 and Example 2 than in Comparative Example 3. However, the effect of improving transmittance was higher in Example 2 than in Comparative Example 4. While the transmittance of Comparative Example 3 was 4.02%, the transmittance of Comparative Example 4 was 4.13%, and the transmittance of Example 2 was 4.38%. From the above verification results, it was confirmed that the effect of improving transmittance can be enhanced by adopting the configuration of the present embodiment.

Note that in the present embodiment, an example has been described in which each pixel P2 has a shape in which the pixel longitudinal direction D1 and the pixel traverse direction D2 are defined, but the shape of each pixel P2 is not limited to such a shape. Each pixel P2 may have, for example, a substantially square shape.

Third Embodiment

Figure 16:
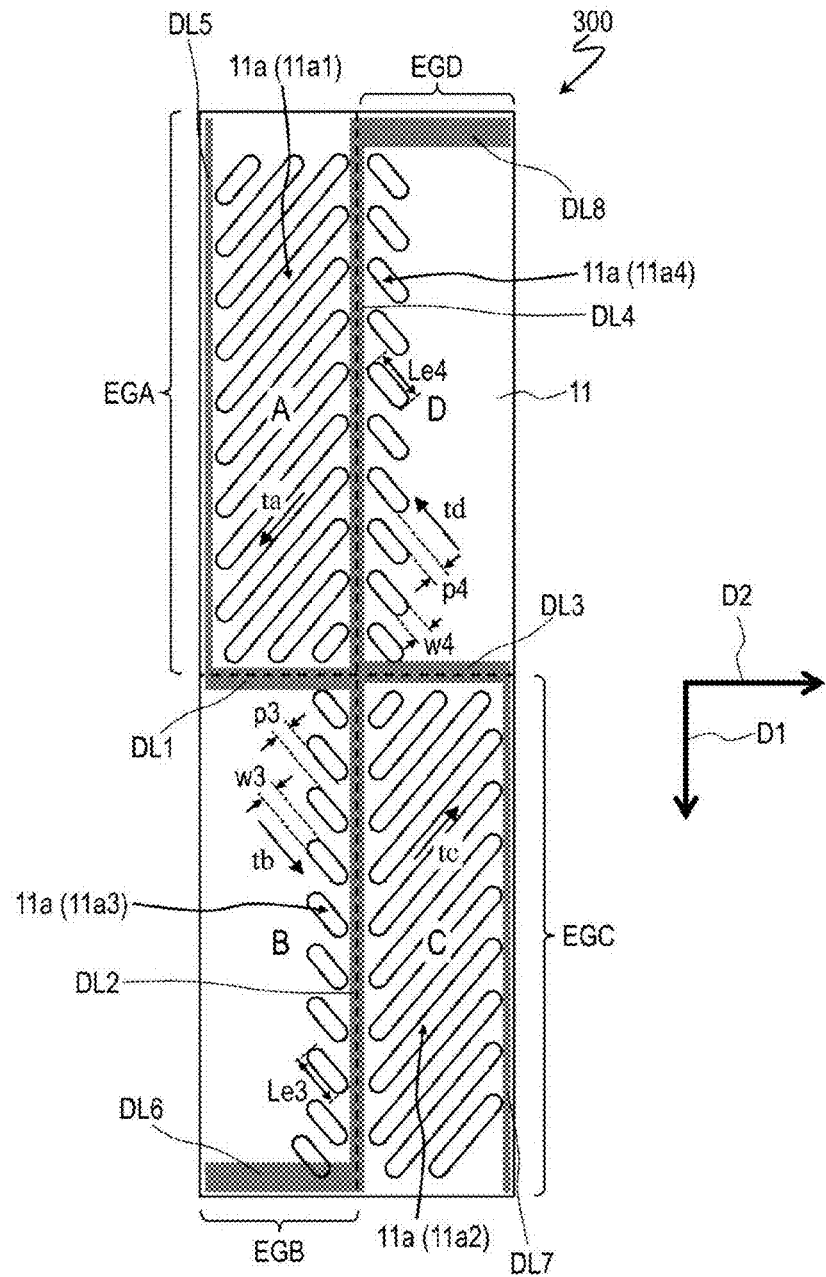
FIG. 16 is a plan view schematically illustrating still another liquid crystal display device 300 according to an embodiment of the disclosure.

A liquid crystal display device 300 according to the present embodiment will be described with reference to FIG. 16. FIG. 16 is a plan view schematically illustrating the liquid crystal display device 300.

Each pixel of the liquid crystal display device 300 has the same alignment division structure as the pixel P1 illustrated in FIG. 4. Thus, dark lines DL1 to DL8, which form a swastika shape as a whole, occur in a pixel.

As illustrated in FIG. 16, a pixel electrode 11 of the liquid crystal display device 300 is different from the pixel electrode 11 of the liquid crystal display device 100 illustrated in FIG. 2 in that the pixel electrode 11 of the liquid crystal display device 300 further has a plurality of third slits 11a3 formed in a region corresponding to a liquid crystal domain B and a plurality of fourth slits 11a4 formed in a region corresponding to a liquid crystal domain D. Here, the liquid crystal domain B is adjacent to a liquid crystal domain A in a pixel longitudinal direction D1, and adjacent to a liquid crystal domain C in a pixel traverse direction D2. The liquid crystal domain D is adjacent to the liquid crystal domain A in the pixel traverse direction D2, and adjacent to the liquid crystal domain C in the pixel longitudinal direction D1.

The plurality of third slits 11a3 extend approximately parallel to a reference alignment direction tb in the liquid crystal domain B. Each of the plurality of third slits 11a3 is shorter than at least some first slits 11a1 among a plurality of first slits 11a1 and at least some second slits 11a2 among a plurality of second slits 11a2. Each of the third slits 11a3 is located in the vicinity of the liquid crystal domain C in the region corresponding to the liquid crystal domain B. That is, the plurality of third slits 11a3 are arranged not in an entire region corresponding to the liquid crystal domain B, but only in part thereof.

The plurality of fourth slits 11a4 extend approximately parallel to a reference alignment direction td in the liquid crystal domain D. Each of the plurality of fourth slits 11a4 is shorter than at least some first slits 11a1 among the plurality of first slits 11a1 and at least some second slits 11a2 among the plurality of second slits 11a2. Each of the fourth slits 11a4 is located in the vicinity of the liquid crystal domain A in the region corresponding to the liquid crystal domain D. That is, the plurality of fourth slits 11a4 are arranged not in an entire region corresponding to the liquid crystal domain D, but only in part thereof.

In the liquid crystal display device 300 according to the present embodiment, since the pixel electrode 11 has the third slits 11a3 described above, the number of liquid crystal molecules aligned approximately parallel to the reference alignment direction tb in the liquid crystal domain B in the vicinity of the liquid crystal domain C in the region corresponding to the liquid crystal domain B is large (existence probability is higher), and thus an area of the dark line DL2 at a boundary between the liquid crystal domain B and the liquid crystal domain C can be further reduced. Further, since the pixel electrode 11 has the fourth slits 11a4 described above, the number of liquid crystal molecules aligned approximately parallel to a reference alignment direction td in the liquid crystal domain D in the vicinity of the liquid crystal domain A in the region corresponding to the liquid crystal domain D is large (existence probability is higher), and thus an area of the dark line DL4 at a boundary between the liquid crystal domain D and the liquid crystal domain A can be further reduced.

Thus, in the liquid crystal display device 300 according to the present embodiment, the areas of the dark lines DL2 and DL4 can be further reduced, and thus transmittance can be further improved.

Figure 17:
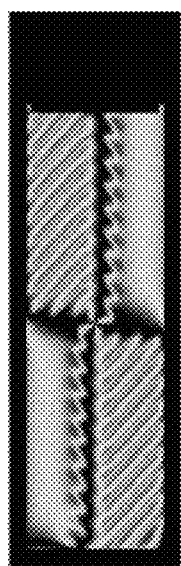
FIG. 17 is a diagram illustrating a result obtained by simulating a transmittance distribution in a pixel during white display in Example 3.

FIG. 17 illustrates a result of verifying the effect of improving transmittance when the pixel electrode 11 is formed with the third slits 11a3 and the fourth slits 11a4 in addition to the first slits 11a1 and the second slits 11a2 (Example 3), as in the present embodiment.

From a comparison between FIG. 7B and FIG. 17, it can be seen that the area of the dark lines is smaller in Example 3 than in Comparative Example 1. Further, the effect of improving transmittance was higher in Example 3 than in Example 1. While the transmittance of Comparative Example 1 was 3.91%, the transmittance of Example 1 was 4.30%, and the transmittance of Example 3 was 4.32%.

A width w3 of the third slit 11a3 and a width w4 of the fourth slit 11a4 (see FIG. 16 for both) are not limited, but are, for example, 2.5 μm or more and 4 μm or less.

A distance p3 between two adjacent third slits 11a3 and a distance p4 between two adjacent fourth slits 11a4 (see FIG. 16 for both) are not limited, but preferably not too large from the viewpoint of increasing the numbers of liquid crystal molecules aligned approximately parallel to the reference alignment directions in the corresponding liquid crystal domains (increasing the existence probability). The distances p3 and p4 are preferably, for example, approximately the same as the width w3 of the third slit 11a3 and the width w4 of the fourth slit 11a4.

From the viewpoint of suppressing transmission loss due to the third slits 11a3, each of the third slits 11a3 is preferably shorter than one-half of a width of the liquid crystal domain B along the pixel traverse direction D2, and specifically, a length Le3 of each of the third slits 11a3 (see FIG. 16) is preferably 6 μm or more and 10 μm or less.

Similarly, from the viewpoint of suppressing transmission loss due to the fourth slits 11a4, each of the fourth slits 11a4 is preferably shorter than one-half of a width of the liquid crystal domain D along the pixel traverse direction D2, and specifically, a length Le4 of each of the fourth slits 11a4 (see FIG. 16) is preferably 6 μm or more and 10 μm or less.

The directions in which the third slit 11a3 and the fourth slit 11a4 extend need not be strictly parallel to the reference alignment directions in the corresponding liquid crystal domains. The third slit 11a3 and the fourth slit 11a4 only need to be able to improve transmittance substantially the same as when the third slit 11a3 and the fourth slit 11a4 extend parallel to the reference alignment directions. For example, the directions in which the third slit 11a3 and the fourth slit 11a4 extend may form angles of 5° or less with the reference alignment directions in the corresponding liquid crystal domains.

Note that the numbers of the third slits 11a3 and the fourth slits 11a4 are not limited to the numbers illustrated in the figure.

Fourth Embodiment

Figure 18:
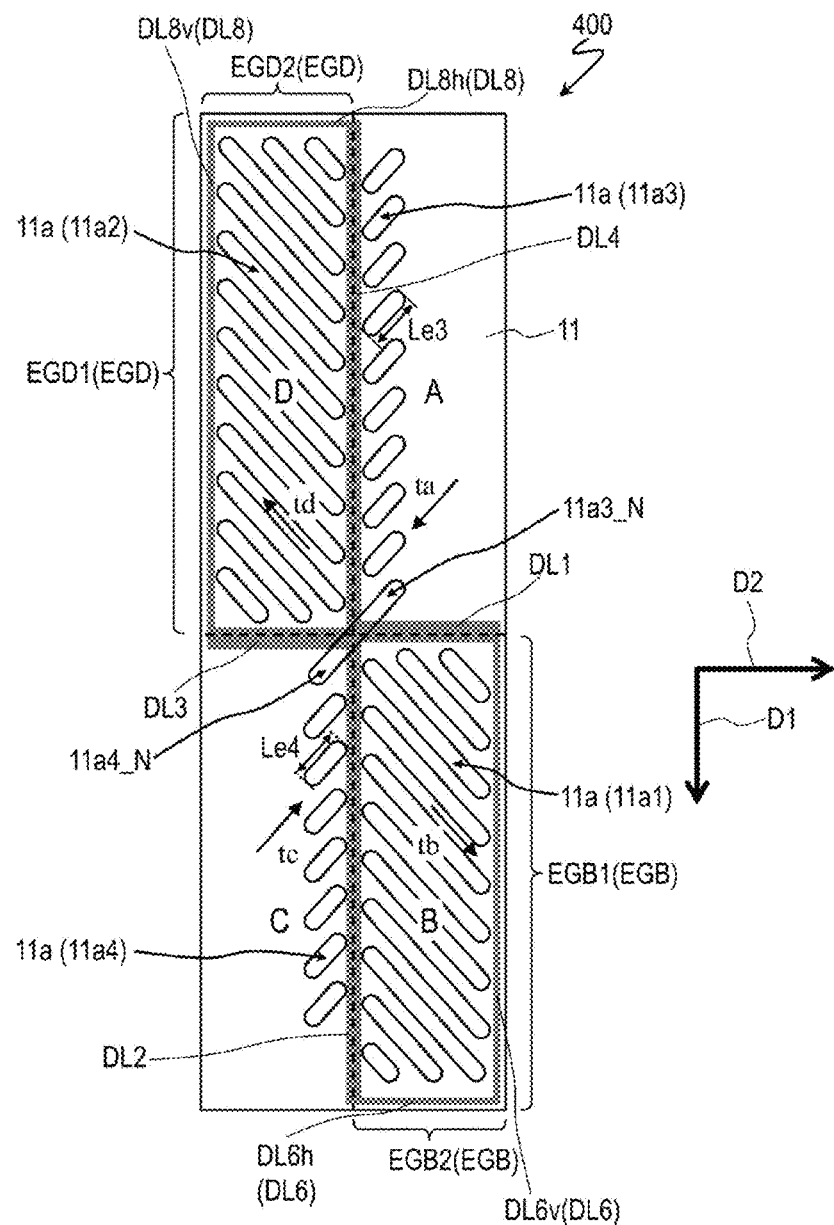
FIG. 18 is a plan view schematically illustrating yet another liquid crystal display device 400 according to an embodiment of the disclosure.

A liquid crystal display device 400 according to the present embodiment will be described with reference to FIG. 18. FIG. 18 is a plan view schematically illustrating the liquid crystal display device 400.

Each pixel of the liquid crystal display device 400 has the same alignment division structure as the pixel P2 illustrated in FIG. 10. Thus, dark lines DL1 to DL4, DL6, and DL8, which form a FIG. 8 shape as a whole, occur in a pixel.

As illustrated in FIG. 18, a pixel electrode 11 of the liquid crystal display device 400 is different from the pixel electrode 11 of the liquid crystal display device 200 illustrated in FIG. 11 in that the pixel electrode 11 of the liquid crystal display device 400 further has a plurality of third slits 11a3 formed in a region corresponding to a liquid crystal domain A and a plurality of fourth slits 11a4 formed in a region corresponding to a liquid crystal domain C. Here, the liquid crystal domain A is adjacent to a liquid crystal domain B in a pixel longitudinal direction D1, and is adjacent to a liquid crystal domain D in a pixel traverse direction D2. The liquid crystal domain C is adjacent to the liquid crystal domain B in the pixel traverse direction D2, and adjacent to the liquid crystal domain D in the pixel longitudinal direction D1.

The plurality of third slits 11a3 extend approximately parallel to a reference alignment direction to in the liquid crystal domain A. Each of the plurality of third slits 11a3 is shorter than at least some first slits 11a1 among a plurality of first slits 11a1 and at least some second slits 11a2 among a plurality of second slits 11a2. Each of the third slits 11a3 is located in the vicinity of the liquid crystal domain D in the region corresponding to the liquid crystal domain A. That is, the plurality of third slits 11a3 are arranged not in an entire region corresponding to the liquid crystal domain A, but only in part thereof.

The plurality of fourth slits 11a4 extend approximately parallel to a reference alignment direction tc in the liquid crystal domain C. Each of the plurality of fourth slits 11a4 is shorter than at least some first slits 11a1 among the plurality of first slits 11a1 and at least some second slits 11a2 among the plurality of second slits 11a2. Each of the fourth slits 11a4 is located in the vicinity of the liquid crystal domain B in the region corresponding to the liquid crystal domain C. That is, the plurality of fourth slits 11a4 are arranged not in an entire region corresponding to the liquid crystal domain C, but only in part thereof.

In the illustrated example, a third slit 11a3_N located at a position closest to the liquid crystal domain C among the plurality of third slits 11a3 is contiguous with a fourth slit 11a4_N located at a position closest to the liquid crystal domain A among the plurality of fourth slits 11a4. That is, the third slit 11a3_N and the fourth slit 11a4_N, which are located at a center portion in the pixel, are connected.

In the liquid crystal display device 400 according to the present embodiment, since the pixel electrode 11 has the third slits 11a3 described above, the number of liquid crystal molecules aligned approximately parallel to the reference alignment direction tc in the liquid crystal domain A in the vicinity of the liquid crystal domain D in the region corresponding to the liquid crystal domain A is large (existence probability is higher), and thus an area of the dark line DL4 at a boundary of the liquid crystal domain A and the liquid crystal domain D can be further reduced. Further, since the pixel electrode 11 has the fourth slits 11a4 described above, the number of liquid crystal molecules aligned approximately parallel to the reference alignment direction tc in the liquid crystal domain C in the vicinity of the liquid crystal domain B in the region corresponding to the liquid crystal domain C is large (existence probability is higher), and thus an area of the dark line DL2 at a boundary between the liquid crystal domain C and the liquid crystal domain B can be further reduced.

Thus, in the liquid crystal display device 400 according to the present embodiment, the areas of the dark lines DL2 and DL4 can be further reduced, and thus transmittance can be further improved.

Figure 19:
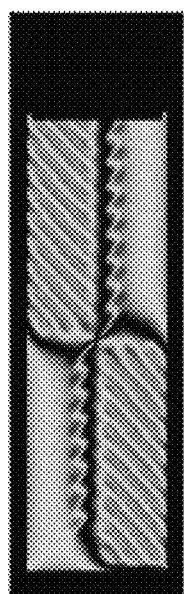
FIG. 19 is a diagram illustrating a result obtained by simulating a transmittance distribution in a pixel during white display in Example 4.

FIG. 19 illustrates a result of verifying the effect of improving transmittance when the pixel electrode 11 is formed with the third slits 11a3 and the fourth slits 11a4 in addition to the first slits 11a1 and the second slits 11a2 (Example 4), as in the present embodiment.

From a comparison between FIG. 13B and FIG. 19, it can be seen that the area of the dark lines is smaller in Example 4 than in Comparative Example 3. Further, the effect of improving transmittance was higher in Example 4 than in Example 2. While the transmittance of Comparative Example 3 was 4.02%, the transmittance of Example 2 was 4.38%, and the transmittance of Example 4 was 4.41%.

From the viewpoint of suppressing transmission loss due to the third slits 11a3, each of the third slits 11a3 is preferably shorter than one-half of a width of the liquid crystal domain A along the pixel traverse direction D2, and specifically, a length Le3 of each of the third slits 11a3 (see FIG. 18) is preferably 6 μm or more and 10 μm or less.

Similarly, from the viewpoint of suppressing transmission loss due to the fourth slits 11a4, each of the fourth slits 11a4 is preferably shorter than one-half of a width of the liquid crystal domain C along the pixel traverse direction D2, and specifically, a length Le4 of each of the fourth slits 11a4 (see FIG. 18) is preferably 6 μm or more and 10 μm or less.

Figure 20:
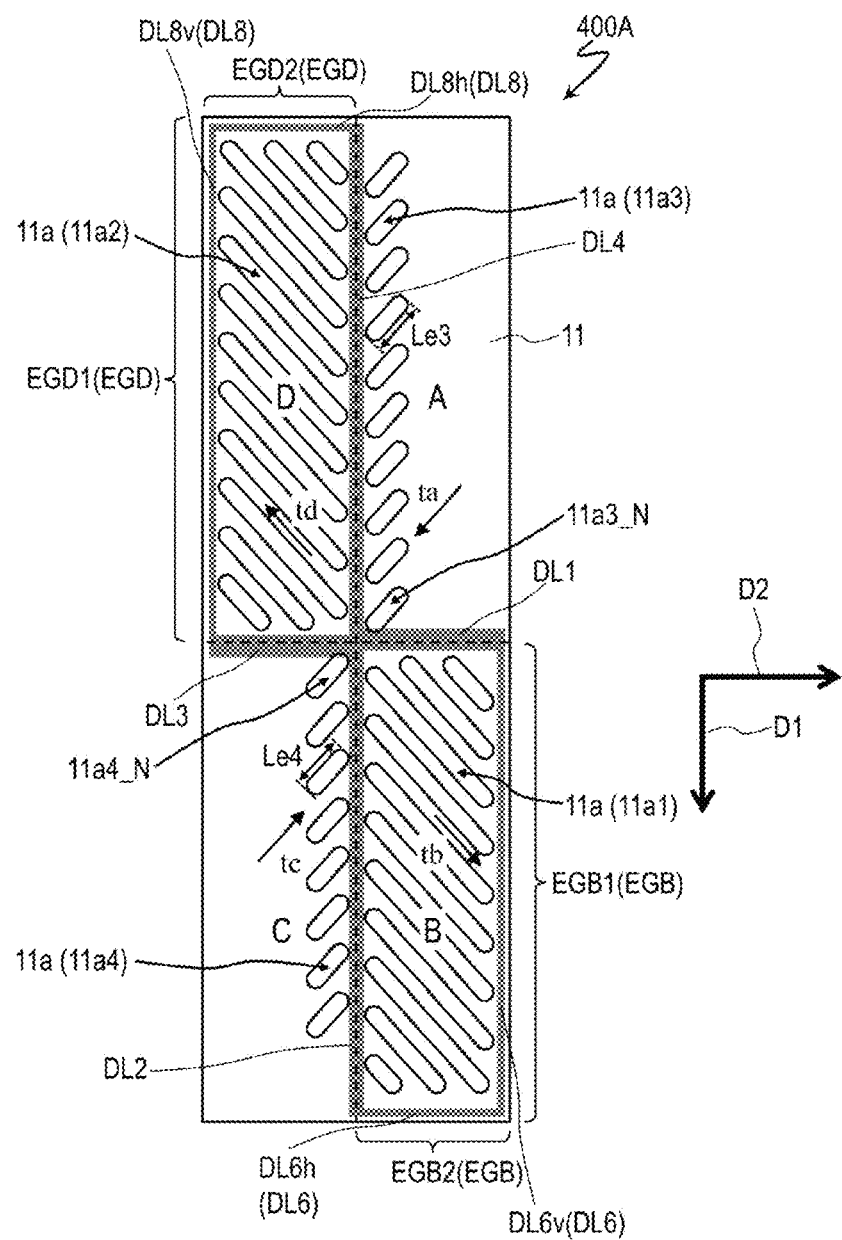
FIG. 20 is a plan view schematically illustrating yet a further liquid crystal display device 400A according to the embodiment of the disclosure.

FIG. 18 illustrates a configuration in which the third slit 11a3_N and the fourth slit 11a4_N located at the center portion in the pixel are contiguous, but as in a liquid crystal display device 400A illustrated in FIG. 20, a third slit 11a3_N located at a position closest to the liquid crystal domain C among a plurality of third slits 11a3 may not be contiguous with a fourth slit 11a4_N located at a position closest to the liquid crystal domain A among a plurality of fourth slits 11a4. That is, the third slit 11a3_N and the fourth slit 11a4_N, which are located at the center portion in the pixel, need not be connected. As illustrated in FIG. 18, when the third slit 11a3_N located at the position closest to the liquid crystal domain C is contiguous with the fourth slit 11a4_N located at the position closest to the liquid crystal domain A, the alignment disorder that occurs at the center portion of the pixel (at or near the center of the four liquid crystal domains A to D arranged in two rows and two columns) can be suppressed.

Figure 21:
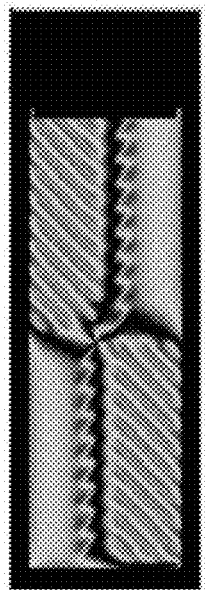
FIG. 21 is a diagram illustrating a result obtained by simulating a transmittance distribution in a pixel during white display in Example 4A.

FIG. 21 illustrates a result of verifying the effect of improving transmittance when the third slit 11a3_N and the fourth slit 11a4_N located at the center portion in the pixel are not contiguous as illustrated in FIG. 20 (Example 4A). From a comparison between FIG. 19 and FIG. 21, it can be seen that in Example 4, the alignment disorder at the center portion of the pixel is suppressed compared to Example 4A. The reason why the alignment disorder is suppressed by connecting the third slit 11a3_N and the fourth slit 11a4_N located at the center portion in the pixel will be described later.

Fifth Embodiment

Figure 22:
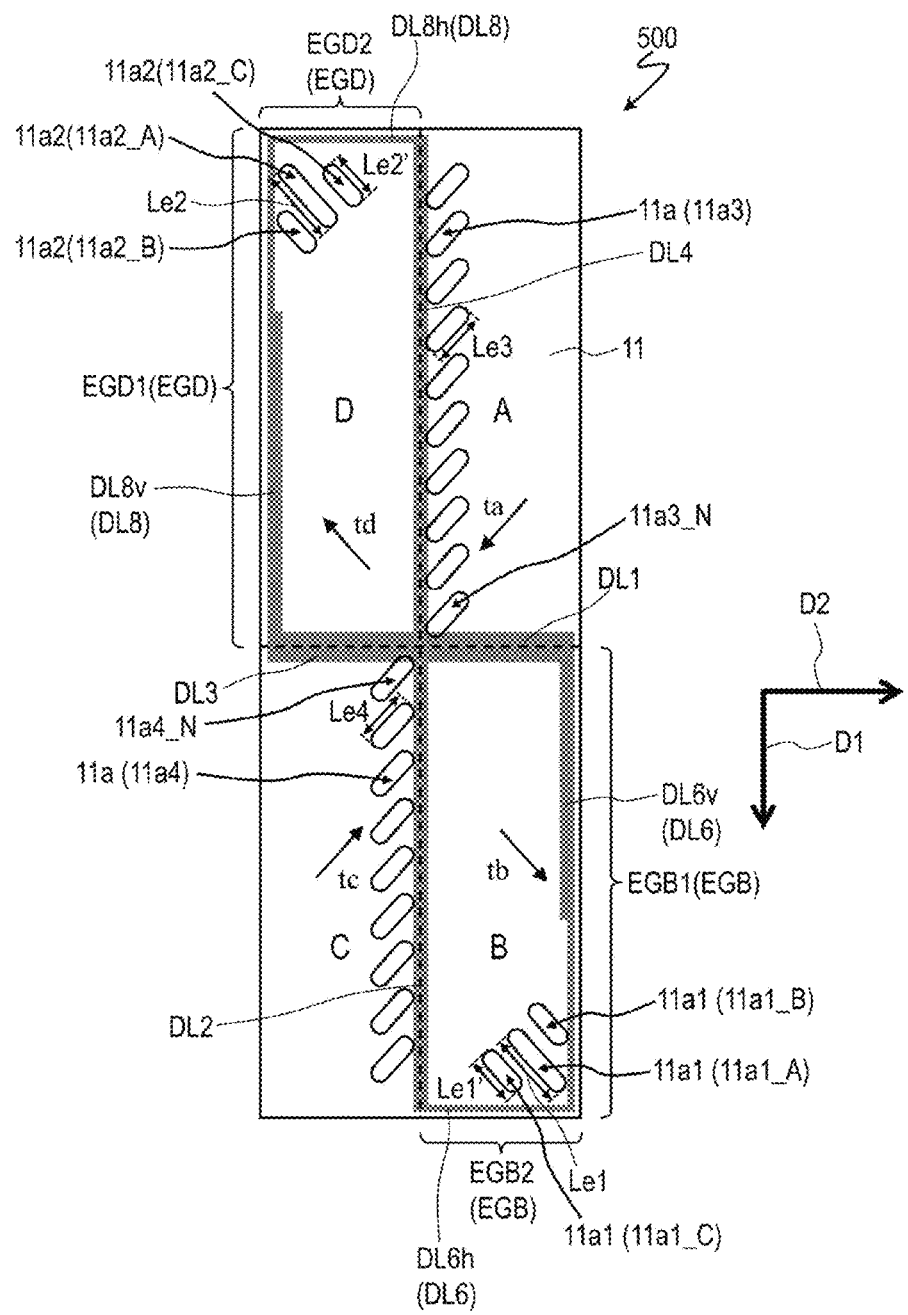
FIG. 22 is a plan view schematically illustrating a still further liquid crystal display device 500 according to an embodiment of the disclosure.

A liquid crystal display device 500 according to the present embodiment will be described with reference to FIG. 22. FIG. 22 is a plan view schematically illustrating the liquid crystal display device 500.

Each pixel of the liquid crystal display device 500 has the same alignment division structure as the pixel P2 illustrated in FIG. 10. Thus, dark lines DL1 to DL4, DL6, and DL8, which form a FIG. 8 shape as a whole, occur in a pixel.

In a pixel electrode 11 of the liquid crystal display device 500, the arrangement of a plurality of first slits 11a1 formed in a region corresponding to a liquid crystal domain B and a plurality of second slits 11a2 formed in a region corresponding to a liquid crystal domain D is different from that in the pixel electrode 11 of the liquid crystal display device 400 according to the fourth embodiment.

A plurality of third slits 11a3 in the pixel electrode 11 of the liquid crystal display device 500 are arranged only in part of a region corresponding to a liquid crystal domain A, similar to the plurality of third slits 11a3 in the pixel electrode 11 of the liquid crystal display device 400. Each of the third slits 11a3 is shorter than, for example, one-half of a width of the liquid crystal domain A along a pixel traverse direction D2, and is located in the vicinity of the liquid crystal domain D in the region corresponding to the liquid crystal domain A. Similarly, a plurality of fourth slits 11a4 are arranged only in part of a region corresponding to a liquid crystal domain C. Each of the fourth slits 11a4 is shorter than, for example, one-half of a width of the liquid crystal domain C along the pixel traverse direction D2, and is located in the vicinity of the liquid crystal domain B in the region corresponding to the liquid crystal domain C.

In the present embodiment, the number of the first slits 11a1 is less than the number of the third slits 11a3 and the number of the fourth slits 11a4. In the illustrated example, the number of the first slits 11a1 is 3 while the number of the third slits 11a3 is 10 and the number of the fourth slits 11a4 is 9. One first slit 11a1_A among the three first slits 11a1 is longer than the other two first slits 11a1_B and 11a1_C and is arranged therebetween.

Each of the first slits 11a1 is shorter than a width of the liquid crystal domain B along the pixel traverse direction D2. Each of the first slits 11a1 is located, in a region corresponding to the liquid crystal domain B, in the vicinity of an intersection of a portion EGB1 extending approximately parallel to a pixel longitudinal direction D1 and a portion EGB2 extending approximately parallel to the pixel traverse direction D2 of an edge portion EGB. Thus, the plurality of first slits 11a1 are arranged not in an entire region corresponding to the liquid crystal domain B, but only in part thereof.

The number of the second slits 11a2 is less than the number of the third slits 11a3 and the number of the fourth slits 11a4. In the illustrated example, the number of the second slits 11a2 is 3 while the number of the third slits 11a3 is 10 and the number of the fourth slits 11a4 is 9. One second slit 11a2_A among the three second slits 11a2 is longer than the other two second slits 11a2_B and 11a2_C, and is arranged therebetween.

Each of the second slit 11a2 is shorter than a width of the liquid crystal domain D along the pixel traverse direction D2. Each of the second slits 11a2 is located, in a region corresponding to the liquid crystal domain D, in the vicinity of an intersection of a portion EGD1 extending approximately parallel to the pixel longitudinal direction D1 and a portion EGD2 extending approximately parallel to the pixel traverse direction D2 of an edge portion EGD. Thus, the plurality of second slits 11a2 are arranged not in an entire region corresponding to the liquid crystal domain D, but only in part thereof.

The liquid crystal display device 500 according to the present embodiment having the configuration described above can improve transmittance in a similar manner to the liquid crystal display device 400 according to the fourth embodiment. In the liquid crystal display device 500 according to the present embodiment, the first slits 11a1 are arranged in part of the region corresponding to the liquid crystal domain B and the second slits 11a2 are arranged in part of the region corresponding to the liquid crystal domain D. This allows the area of the regions where the slits 11a are formed in the entire pixel electrode 11 to be reduced, further improving productivity.

Figure 23:
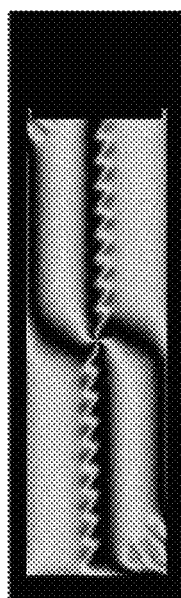
FIG. 23 is a diagram illustrating a result obtained by simulating a transmittance distribution in a pixel during white display in Example 5.

FIG. 23 illustrates a result of verifying the effect of improving transmittance when the first slits 11a1 and the second slits 11a2 are arranged as in the present embodiment (Example 5).

From a comparison between FIG. 13B and FIG. 23, it can be seen that the area of the dark lines is smaller in Example 5 than in Comparative Example 3. While the transmittance of Comparative Example 3 was 4.02%, the transmittance of Example 5 was 4.20%.

In the similar manner as described for the liquid crystal display device 400 according to the fourth embodiment, from the viewpoint of suppressing transmission loss due to the third slits 11a3, each of the third slits 11a3 is preferably shorter than one-half of a width of the liquid crystal domain A along the pixel traverse direction D2, and specifically, a length Le3 of each of the third slits 11a3 (see FIG. 22) is preferably 6 µm or more and 10 µm or less. Similarly, from the viewpoint of suppressing transmission loss due to the fourth slits 11a4, each of the fourth slits 11a4 is preferably shorter than one-half of a width of the liquid crystal domain C along the pixel traverse direction D2, and specifically, a length Le4 of each of the fourth slits 11a4 (see FIG. 22) is preferably 6 µm or more and 10 µm or less.

From the viewpoint of transmittance, a length Le1 of the relatively long first slit 11a1_A (see FIG. 22) among the plurality of first slits 11a1 is preferably 11 µm or more and 15 µm or less, and a length Le1' of the relatively short first slits 11a1_B and 11a1_C (see FIG. 22) is preferably 6 µm or more and 10 µm or less. Similarly, a length Le2 of the relatively long second slit 11a2_A (see FIG. 22) among the plurality of second slits 11a2 is preferably 11 µm or more and 15 µm or less, and a length Le2' of the relatively short second slits 11a2_B and 11a2_C (see FIG. 22) is preferably 6 µm or more and 10 µm or less.

Sixth Embodiment

Figure 24:
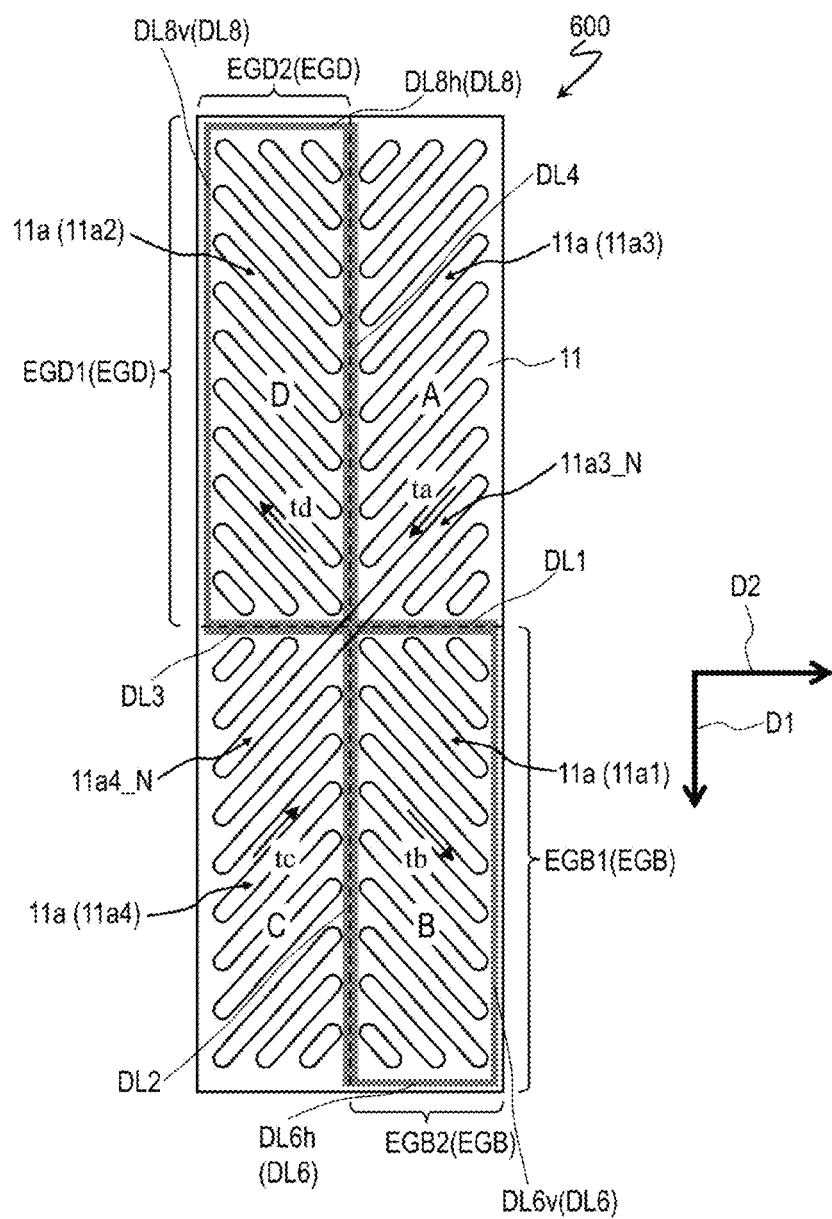
FIG. 24 is a plan view schematically illustrating yet a further liquid crystal display device 600 according to an embodiment of the disclosure.

A liquid crystal display device 600 according to the present embodiment will be described with reference to FIG. 24. FIG. 24 is a plan view schematically illustrating the liquid crystal display device 600.

Each pixel of the liquid crystal display device 600 has the same alignment division structure as the pixel P2 illustrated in FIG. 10. Thus, dark lines DL1 to DL4, DL6, and DL8, which form a FIG. 8 shape as a whole, occur in a pixel.

In a pixel electrode 11 of the liquid crystal display device 600, the arrangement of a plurality of third slits 11a3 formed in a region corresponding to a liquid crystal domain A and a plurality of fourth slits 11a4 formed in a region corresponding to a liquid crystal domain C is different from that in the pixel electrode 11 of the liquid crystal display device 400 according to the fourth embodiment.

The plurality of third slits 11a3 in the pixel electrode 11 of the liquid crystal display device 600 are arranged over substantially an entire region corresponding to the liquid crystal domain A. Similarly, the plurality of fourth slits 11a4 are arranged over substantially an entire region corresponding to the liquid crystal domain C. That is, in the liquid crystal display device 600, the slits 11a are formed over an entire pixel electrode 11.

In the liquid crystal display device 600, the slits 11a are formed over the entire pixel electrode 11 to reduce the area of the dark lines and improve transmittance compared to a configuration in which no slits are formed in the pixel electrode at all.

In the liquid crystal display device 600, as illustrated in FIG. 24, a third slit 11a3_N located at a position closest to the liquid crystal domain C among the plurality of third slits 11a3, is contiguous with a fourth slit 11a4_N located at a position closest to the liquid crystal domain A among the plurality of fourth slits 11a4. That is, the third slit 11a3_N and the fourth slit 11a4_N, which are located at a center portion in the pixel, are connected. This suppresses the occurrence of alignment disorder at the center portion of the pixel.

Figure 25:
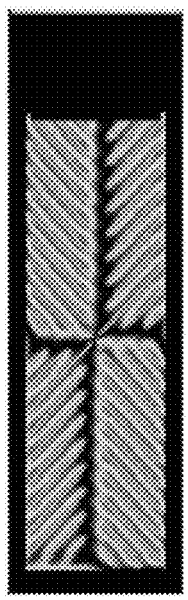
FIG. 25 is a diagram illustrating a result obtained by simulating a transmittance distribution in a pixel during white display in Example 6.

FIG. 25 illustrates a transmittance distribution in the pixel when the third slit 11a3_N is contiguous with the fourth slit 11a4_N at the center portion in the pixel as illustrated in FIG. 24 (Example 6). From a comparison between FIG. 14B and FIG. 25, it can be seen that in Example 6, the alignment disorder at the center portion of the pixel is suppressed compared to Comparative Example 4. The reason why the alignment disorder is suppressed is considered as follows. In the following description, an end portion of the liquid crystal molecule on a front side (viewer side) will be referred to as a "head" of the liquid crystal molecule for convenience.

In the liquid crystal domains A and C, the liquid crystal molecules are tilted so that the heads thereof face inward relative to the center of the pixel, as can be easily understood from illustrated reference alignment directions ta and tc. On the other hand, in liquid crystal domains B and D, the liquid crystal molecules are tilted so that the heads thereof face outward relative to the center of the pixel, as can be easily understood from illustrated reference alignment directions tb and td. When the two slits 11a located at the center portion in the pixel and adjacent to each other in an oblique direction are connected, alignment regulating forces act on the liquid crystal molecules at a connection portion of both slits 11a to tilt the liquid crystal molecules so that the heads thereof face outward in the direction perpendicular to the longitudinal direction of the slits 11a.

Thus, when the third slit 11a3_N and the fourth slit 11a4_N are connected, the alignment is stabilized (i.e., alignment disorder is suppressed) because the directions in which the liquid crystal molecules are tilted at the connection portion coincide with the directions in which the liquid crystal molecules are tilted in the liquid crystal domains B and D, and do not interfere with the alignments in the liquid crystal domains A and C.

In contrast, when the slit located at a position closest to the liquid crystal domain D among the plurality of first slits 11a1 and the slit located at a position closest to the liquid crystal domain B among the plurality of second slits 11a2 are contiguous (i.e., when the first slit 11a1 and the second slit 11a2, which are located at the center portion in the pixel, are connected), the directions in which the liquid crystal molecules are tilted at the connection portion are opposite to the directions in which the liquid crystal molecules are tilted in the liquid crystal domains A and C, resulting in alignment disorder.

Figure 26:
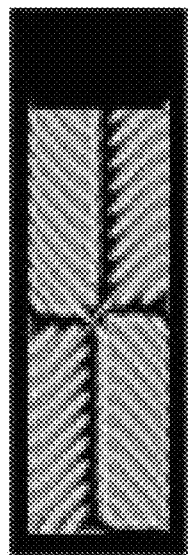
FIG. 26 is a diagram illustrating a result obtained by simulating a transmittance distribution in a pixel during white display in Comparative Example 5.

FIG. 26 illustrates a transmittance distribution in the pixel when the first slit 11a1 closest to the liquid crystal domain D is contiguous with the second slit 11a2 closest to the liquid crystal domain B (Comparative Example 5). It can be seen that in Comparative Example 5, the alignment disorder occurs at the center portion of the pixel.

As in Comparative Example 4 illustrated in FIG. 14A, when the slits 11a located at the center portion in the pixel and adjacent to each other in the oblique direction are not connected at all, the liquid crystal molecules at the center portion in the pixel are subjected to the alignment regulating forces that cause the heads thereof to face inward relative to the center of the pixel, so that there are the liquid crystal molecules tilted in the directions opposite to the reference alignment directions tb and td of the liquid crystal domains B and D. Thus, as illustrated in FIG. 14B, alignment disorder occurs at the center portion in the pixel.

(Other Alignment Division Structures)

The alignment division structure is not limited to the examples given in the previous descriptions.

Figure 27A:
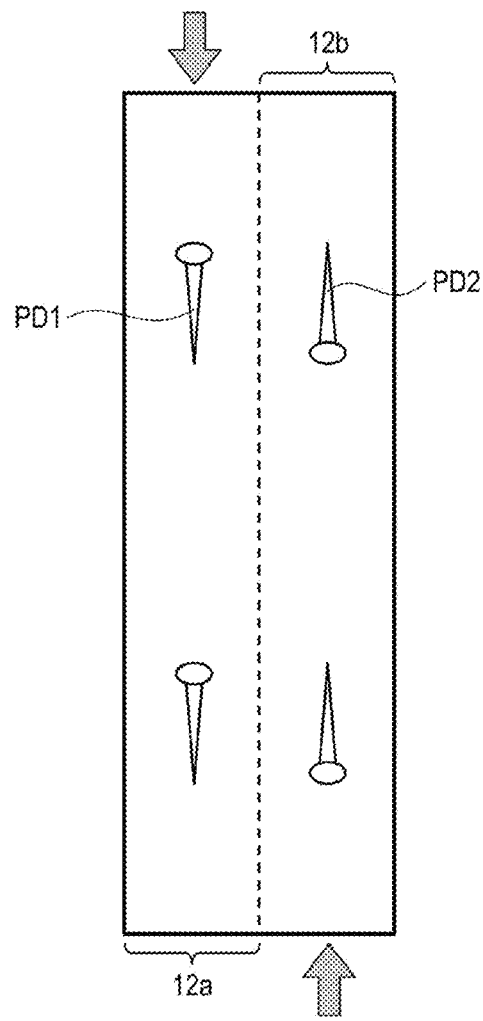
FIG. 27A is a diagram for describing a method for obtaining an alignment division structure of a pixel P3.
Figure 27B:
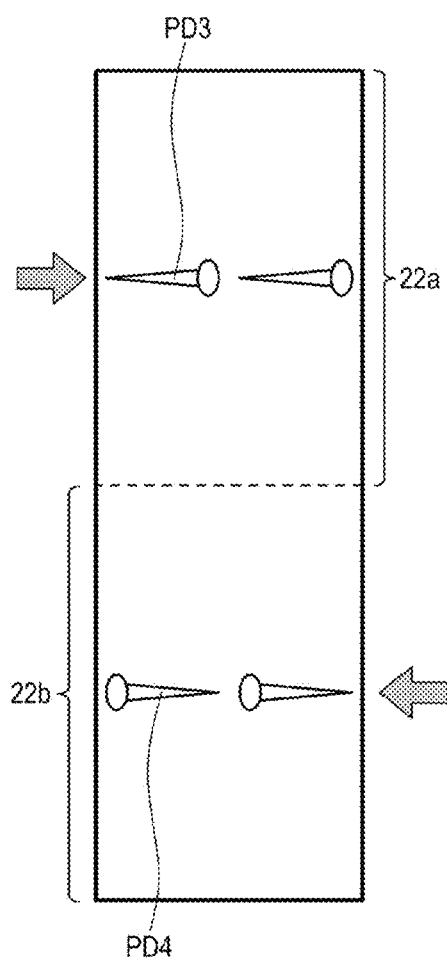
FIG. 27B is a diagram for describing the method for obtaining the alignment division structure of the pixel P3.
Figure 27C:
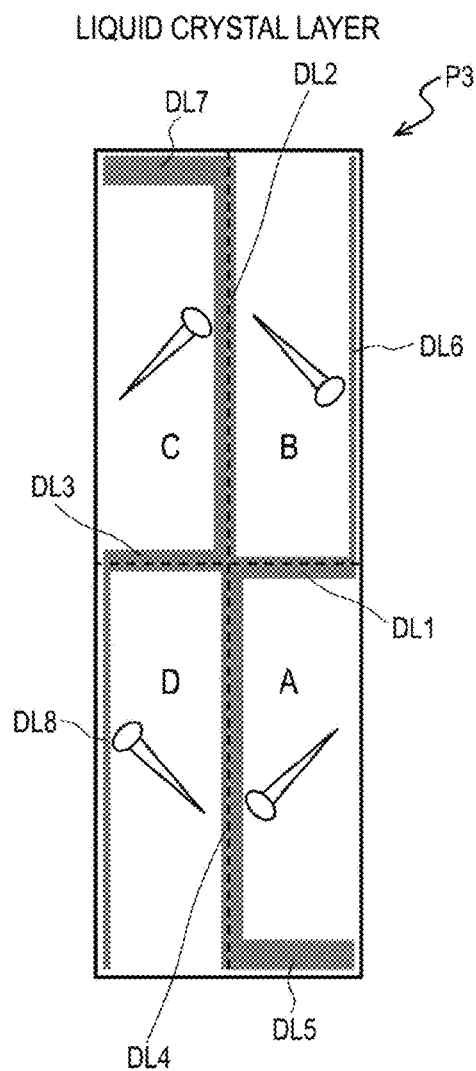
FIG. 27C is a diagram for describing the method for obtaining the alignment division structure of the pixel P3.

For example, by bonding an active matrix substrate 10 that has been subjected to an alignment treatment as illustrated in FIG. 27A and a counter substrate 20 that has been subjected to an alignment treatment as illustrated in FIG. 27B, a pixel P3 in which the alignment is divided as illustrated in FIG. 27C can be formed. The pixel P3 illustrated in FIG. 27C has four liquid crystal domains A to D, similar to the pixel P1 illustrated in FIG. 4.

However, in the pixel P1 illustrated in FIG. 4, the liquid crystal domains A to D are arranged in the order of upper left, lower left, lower right, and upper right (i.e., counterclockwise from the upper left), whereas in the pixel P3 illustrated in FIG. 27C, the liquid crystal domains A to D are arranged in the order of lower right, upper right, upper left, and lower left (i.e., counterclockwise from the lower right). This is because, the pixel P1 illustrated in FIG. 4 and the pixel P3 illustrated in FIG. 27C have opposite pretilt directions for the left region and the right region of the active matrix substrate 10 and the upper region and the lower region of the counter substrate 20, respectively. In the pixel P3 illustrated in FIG. 27C, dark lines DL1 to DL8 form a swastika shape (more specifically, a left swastika shape) as a whole.

When an alignment division structure such as a pixel P3 is employed, the same effect as in the liquid crystal display device 100 according to the first embodiment can be obtained by forming a plurality of first slits 11a1 and a plurality of second slits 11a2 in a region corresponding to the liquid crystal domain B and a region corresponding to the liquid crystal domain D of a pixel electrode 11, respectively. By forming a plurality of third slits 11a3 and a plurality of fourth slits 11a4 in part of a region corresponding to the liquid crystal domain A and part of a region corresponding to the liquid crystal domain C of the pixel electrode 11, respectively, the same effect as in the liquid crystal display device 300 according to the third embodiment can be obtained.

Figure 28A:
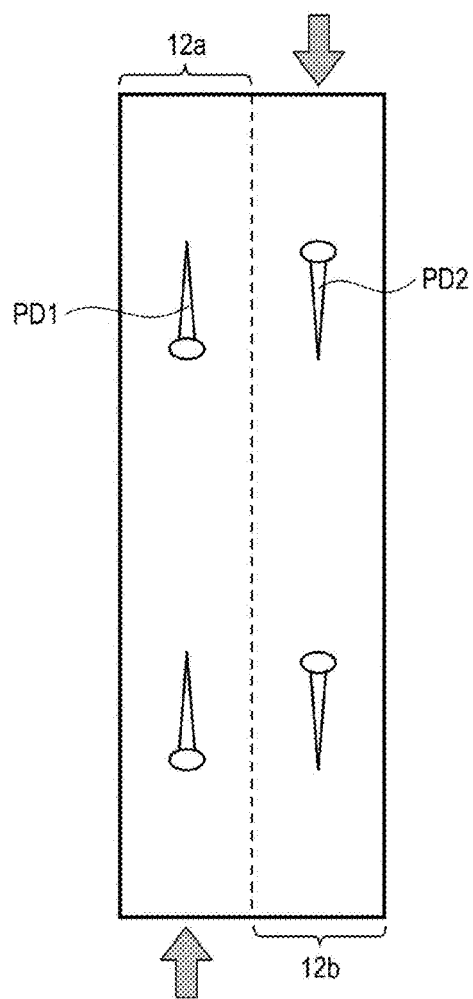
FIG. 28A is a diagram for describing a method for obtaining an alignment division structure of a pixel P4.
Figure 28B:
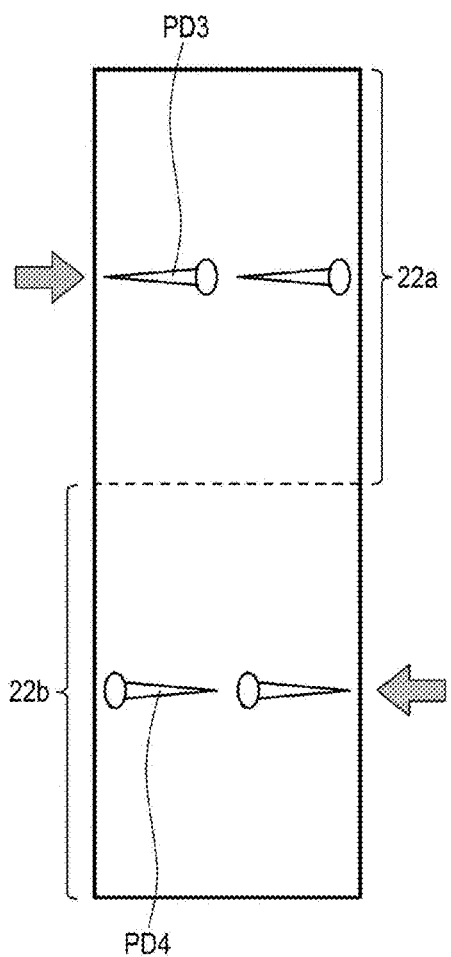
FIG. 28B is a diagram for describing the method for obtaining the alignment division structure of the pixel P4.
Figure 28C:
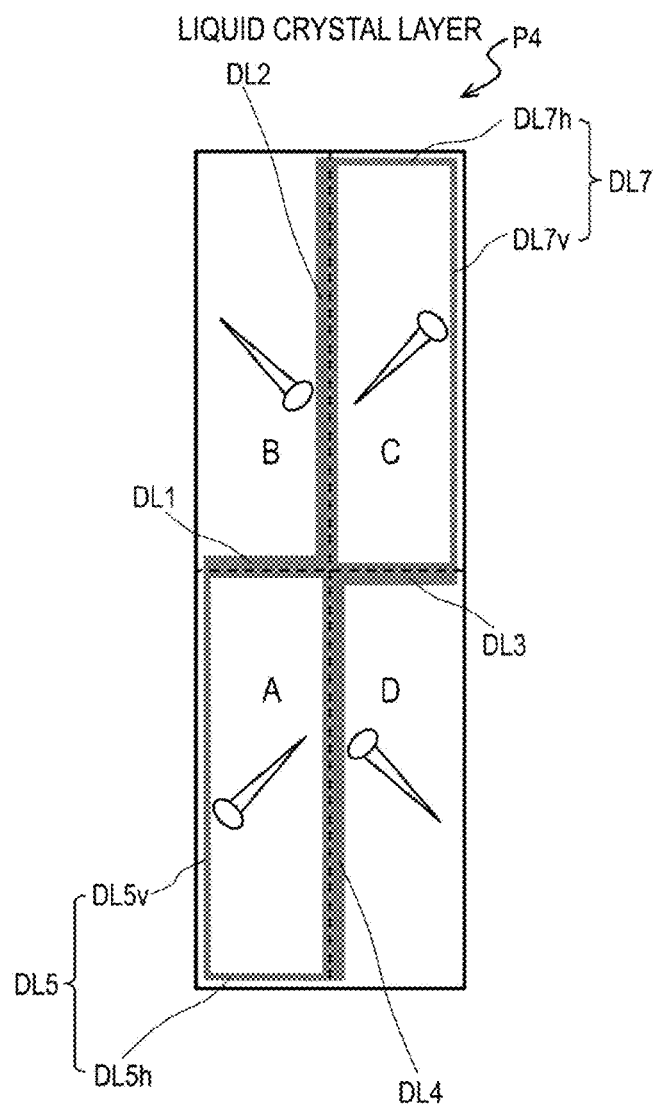
FIG. 28C is a diagram for describing the method for obtaining the alignment division structure of the pixel P4.

By bonding an active matrix substrate 10 that has been subjected to an alignment treatment as illustrated in FIG. 28A and a counter substrate 20 that has been subjected to an alignment treatment as illustrated in FIG. 28B, a pixel P4 in which the alignment is divided as illustrated in FIG. 28C can be formed. The pixel P4 illustrated in FIG. 28C has four liquid crystal domains A to D, similar to the pixel P1 illustrated in FIG. 4.

However, in the pixel P1 illustrated in FIG. 4, the liquid crystal domains A to D are arranged in the order of upper left, lower left, lower right, and upper right (i.e., counterclockwise from the upper left), whereas in the pixel P4 illustrated in FIG. 28C, the liquid crystal domains A to D are arranged in the order of lower left, upper left, upper right, and lower right (i.e., clockwise from the lower left). This is because the pixel P1 illustrated in FIG. 4 and the pixel P4 illustrated in FIG. 28C have opposite pretilt directions for the upper region and the lower region of the counter substrate 20, respectively. In the pixel P4 illustrated in FIG. 28C, dark lines DL1 to DL4, DL5, and DL7 occur. The dark lines DL5 and DL7 include portions DL5h and DL7h parallel to the horizontal direction and portions DL5v and DL7v parallel to the vertical direction, respectively. The dark lines DL1 to DL4, DL5, and DL7 form a FIG. 8 shape as a whole (more specifically, a FIG. 8 shape inclined relative to the vertical direction).

When an alignment division structure such as a pixel P4 is employed, the same effect as in the liquid crystal display device 200 according to the second embodiment can be obtained by forming a plurality of first slits 11a1 and a plurality of second slits 11a2 in a region corresponding to the liquid crystal domain A and a region corresponding to the liquid crystal domain C of a pixel electrode 11, respectively. By forming a plurality of third slits 11a3 and a plurality of fourth slits 11a4 in part of a region corresponding to the liquid crystal domain B and part of a region corresponding to the liquid crystal domain D of the pixel electrode 11, respectively, the same effect as in the liquid crystal display device 400 according to the fourth embodiment can be obtained. Further, by arranging a plurality of first slits 11a1 and a plurality of second slits 11a2 in part of the region corresponding to the liquid crystal domain A and part of the region corresponding to the liquid crystal domain C, respectively, the same effect as in the liquid crystal display device 500 according to the fifth embodiment can be obtained.

According to the embodiments of the disclosure, in a VA mode liquid crystal display device in which an alignment division structure is formed by defining the pretilt directions with the alignment films, a decrease in transmittance caused by dark lines that occur in the vicinities of edges of a pixel electrode can be suppressed. The liquid crystal display devices according to the embodiments of the disclosure are suitably used for applications that require high quality display, such as television receivers. In addition, the embodiments of the disclosure are particularly suitable for liquid crystal display devices in which widths of black matrices and metal wiring lines are set relatively narrow in order to achieve a high aperture ratio (e.g., high-resolution (e.g., 8K resolution) liquid crystal display devices). This is because, when the widths of the black matrices and metal wiring lines are set narrow, it is difficult to make the dark lines that occur in the vicinities of the edges of the pixel electrode overlap the black matrices and metal wiring lines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a first substrate and a second substrate facing each other; and
a liquid crystal layer being a vertical alignment type and provided between the first substrate and the second substrate, the liquid crystal display device having a plurality of pixels arranged in a matrix including a plurality of rows and a plurality of columns,
wherein the first substrate includes a pixel electrode provided in each of the plurality of pixels and a first alignment film provided between the pixel electrode and the liquid crystal layer,
the second substrate includes a counter electrode facing the pixel electrode and a second alignment film provided between the counter electrode and the liquid crystal layer,
each of the plurality of pixels has a plurality of liquid crystal domains having reference alignment directions different from each other defined by the first alignment film and the second alignment film,
the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction,
the first direction, the second direction, the third direction, and the fourth direction are four directions in which a difference between any two directions is approximately equal to an integer multiple of 90°,
the first liquid crystal domain, the second liquid crystal domain, the third liquid crystal domain, and the fourth liquid crystal domain are arranged in two rows and two columns,
the first direction and the second direction form an angle of approximately 180°, and the first liquid crystal domain and the second liquid crystal domain are adjacent to each other in an oblique direction inclined in a row direction and a column direction,
among a plurality of edges of the pixel electrode, a portion adjacent to the first liquid crystal domain includes a first edge portion in which an azimuth angle direction orthogonal to the first edge portion and directed toward an inside of the pixel electrode forms an angle of greater than 90° with the first direction,
among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction, and
the pixel electrode has a plurality of first slits formed in a region corresponding to the first liquid crystal domain and extending approximately parallel to the first direction, and a plurality of second slits formed in a region corresponding to the second liquid crystal domain and extending approximately parallel to the second direction, and no slits in a region corresponding to the third liquid crystal domain and no slits in a region corresponding to the fourth liquid crystal domain.

2. The liquid crystal display device according to claim 1, wherein each of the plurality of pixels has a shape in which a pixel longitudinal direction and a pixel traverse direction are defined, and
each of the first edge portion and the second edge portion extends approximately parallel to the pixel longitudinal direction.

3. The liquid crystal display device according to claim 2, wherein among the plurality of edges of the pixel electrode, a portion adjacent to the third liquid crystal domain includes a third edge portion in which an azimuth angle direction orthogonal to the third edge portion and directed toward the inside of the pixel electrode forms an angle of greater than 90° with the third direction,
among the plurality of edges of the pixel electrode, a portion adjacent to the fourth liquid crystal domain includes a fourth edge portion in which an azimuth angle direction orthogonal to the fourth edge portion and directed toward the inside of the pixel electrode forms an angle of greater than 90° with the fourth direction, and
each of the third edge portion and the fourth edge portion extends approximately parallel to the pixel traverse direction.

4. The liquid crystal display device according to claim 1, wherein each of the first edge portion and the second edge portion includes a portion extending approximately parallel to the row direction and a portion extending approximately parallel to the column direction.

5. The liquid crystal display device according to claim 4, wherein among the plurality of edges of the pixel electrode, a portion adjacent to the third liquid crystal domain does not include an edge portion in which an azimuth angle direction orthogonal to the edge portion and directed toward the inside of the pixel electrode forms an angle of greater than 90° with the third direction and,
among the plurality of edges of the pixel electrode, a portion adjacent to the fourth liquid crystal domain does not include an edge portion in which an azimuth angle direction orthogonal to the edge portion and directed toward the inside of the pixel electrode forms an angle of greater than 90° with the fourth direction.

6. The liquid crystal display device according to claim 1, wherein each of the plurality of pixels has a shape in which a pixel longitudinal direction and a pixel traverse direction are defined, and
each of the first edge portion and the second edge portion includes a portion extending approximately parallel to the pixel longitudinal direction and a portion extending approximately parallel to the pixel traverse direction.

7. The liquid crystal display device according to claim 1, wherein the plurality of first slits are arranged over substantially an entire region corresponding to the first liquid crystal domain, and
the plurality of second slits are arranged over substantially an entire region corresponding to the second liquid crystal domain.

8. The liquid crystal display device according to claim 1, wherein each of the first alignment film and the second alignment film is photo-alignment film.

9. The liquid crystal display device according to claim 1,
wherein in each of the plurality of liquid crystal domains, a pretilt direction defined by the first alignment film and a pretilt direction defined by the second alignment film are different from each other by approximately 90°.

10. A liquid crystal display device comprising:
a first substrate and a second substrate facing each other; and
a liquid crystal layer being a vertical alignment type and provided between the first substrate and the second substrate, the liquid crystal display device having a plurality of pixels arranged in a matrix including a plurality of rows and a plurality of columns,
wherein the first substrate includes a pixel electrode provided in each of the plurality of pixels and a first alignment film provided between the pixel electrode and the liquid crystal layer,
the second substrate includes a counter electrode facing the pixel electrode and a second alignment film provided between the counter electrode and the liquid crystal layer,
each of the plurality of pixels has a plurality of liquid crystal domains having reference alignment directions different from each other defined by the first alignment film and the second alignment film,
the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction,
the first direction, the second direction, the third direction, and the fourth direction are four directions in which a difference between any two directions is approximately equal to an integer multiple of 90°,
the first liquid crystal domain, the second liquid crystal domain, the third liquid crystal domain, and the fourth liquid crystal domain are arranged in two rows and two columns,
the first direction and the second direction form an angle of approximately 180°, and the first liquid crystal domain and the second liquid crystal domain are adjacent to each other in an oblique direction inclined in a row direction and a column direction,
among a plurality of edges of the pixel electrode, a portion adjacent to the first liquid crystal domain includes a first edge portion in which an azimuth angle direction orthogonal to the first edge portion and directed toward the inside of the pixel electrode forms an angle of greater than 90° with the first direction,
among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction,
the pixel electrode has a plurality of first slits formed in a region corresponding to the first liquid crystal domain and extending approximately parallel to the first direction, and a plurality of second slits formed in a region corresponding to the second liquid crystal domain and extending approximately parallel to the second direction, each of the plurality of pixels has a shape in which a pixel longitudinal direction and a pixel traverse direction are defined,
the third liquid crystal domain is adjacent to the first liquid crystal domain in the pixel longitudinal direction and adjacent to the second liquid crystal domain in the pixel traverse direction,
the fourth liquid crystal domain is adjacent to the first liquid crystal domain in the pixel traverse direction and adjacent to the second liquid crystal domain in the pixel longitudinal direction,
the pixel electrode further includes a plurality of third slits formed in a region corresponding to the third liquid crystal domain and extending approximately parallel to the third direction, and a plurality of fourth slits formed in a region corresponding to the fourth liquid crystal domain and extending approximately parallel to the fourth direction,
each of the plurality of third slits is shorter than at least some first slits among the plurality of first slits and at least some second slits among the plurality of second slits, and is located in a vicinity of the second liquid crystal domain in the region corresponding to the third liquid crystal domain, and
each of the plurality of fourth slits is shorter than at least some first slits among the plurality of first slits and at least some second slits among the plurality of second slits, and is located in a vicinity of the first liquid crystal domain in the region corresponding to the fourth liquid crystal domain.

11. The liquid crystal display device according to claim 10,
wherein each of the first edge portion and the second edge portion extends approximately parallel to the pixel longitudinal direction.

12. The liquid crystal display device according to claim 11,
wherein among the plurality of edges of the pixel electrode, a portion adjacent to the third liquid crystal domain includes a third edge portion in which an azimuth angle direction orthogonal to the third edge portion and directed toward the inside of the pixel electrode forms an angle of greater than 90° with the third direction,
among the plurality of edges of the pixel electrode, a portion adjacent to the fourth liquid crystal domain includes a fourth edge portion in which an azimuth angle direction orthogonal to the fourth edge portion and directed toward the inside of the pixel electrode forms an angle of greater than 90° with the fourth direction, and
each of the third edge portion and the fourth edge portion extends approximately parallel to the pixel traverse direction.

13. The liquid crystal display device according to claim 10,
wherein each of the first edge portion and the second edge portion includes a portion extending approximately parallel to the pixel longitudinal direction and a portion extending approximately parallel to the pixel traverse direction.

14. The liquid crystal display device according to claim 13,
wherein among the plurality of edges of the pixel electrode, a portion adjacent to the third liquid crystal domain does not include an edge portion in which an azimuth angle direction orthogonal to the edge portion and directed toward the inside of the pixel electrode forms an angle of greater than 90° with the third direction, and among the plurality of edges of the pixel electrode, a portion adjacent to the fourth liquid crystal domain does not include an edge portion in which an azimuth angle direction orthogonal to the edge portion and directed toward the inside of the pixel electrode forms an angle of greater than 90° with the fourth direction.

15. The liquid crystal display device according to claim 10,
wherein a third slit located at a position closest to the fourth liquid crystal domain among the plurality of third slits is contiguous with a fourth slit located at a position closest to the third liquid crystal domain among the plurality of fourth slits.

16. The liquid crystal display device according to claim 10,
wherein the plurality of first slits are arranged over substantially an entire region corresponding to the first liquid crystal domain, and
the plurality of second slits are arranged over substantially an entire region corresponding to the second liquid crystal domain.

17. The liquid crystal display device according to claim 10,
wherein each of the plurality of third slits is shorter than one-half of a width of the third liquid crystal domain along the pixel traverse direction, and
each of the plurality of fourth slits is shorter than one-half of a width of the fourth liquid crystal domain along the pixel traverse direction.

18. The liquid crystal display device according to claim 10,
wherein a length of each of the plurality of third slits is 6 μm or more and 10 μm or less, and
a length of each of the plurality of fourth slits is 6 μm or more and 10 μm or less.

19. A liquid crystal display device comprising:
a first substrate and a second substrate facing each other; and
a liquid crystal layer being a vertical alignment type and provided between the first substrate and the second substrate, the liquid crystal display device having a plurality of pixels arranged in a matrix including a plurality of rows and a plurality of columns,
wherein the first substrate includes a pixel electrode provided in each of the plurality of pixels and a first alignment film provided between the pixel electrode and the liquid crystal layer,
the second substrate includes a counter electrode facing the pixel electrode and a second alignment film provided between the counter electrode and the liquid crystal layer,
each of the plurality of pixels has a plurality of liquid crystal domains having reference alignment directions different from each other defined by the first alignment film and the second alignment film,
the plurality of liquid crystal domains include a first liquid crystal domain in which the reference alignment direction is a first direction, a second liquid crystal domain in which the reference alignment direction is a second direction, a third liquid crystal domain in which the reference alignment direction is a third direction, and a fourth liquid crystal domain in which the reference alignment direction is a fourth direction,
the first direction, the second direction, the third direction, and the fourth direction are four directions in which a difference between any two directions is approximately equal to an integer multiple of 90°,
the first liquid crystal domain, the second liquid crystal domain, the third liquid crystal domain, and the fourth liquid crystal domain are arranged in two rows and two columns,
the first direction and the second direction form an angle of approximately 180°, and the first liquid crystal domain and the second liquid crystal domain are adjacent to each other in an oblique direction inclined in a row direction and a column direction,
among a plurality of edges of the pixel electrode, a portion adjacent to the first liquid crystal domain includes a first edge portion in which an azimuth angle direction orthogonal to the first edge portion and directed toward the inside of the pixel electrode forms an angle of greater than 90° with the first direction,
among the plurality of edges of the pixel electrode, a portion adjacent to the second liquid crystal domain includes a second edge portion in which an azimuth angle direction orthogonal to the second edge portion and directed toward the inside of the pixel electrode forms an angle of greater than 90° with the second direction,
each of the plurality of pixels has a shape in which a pixel longitudinal direction and a pixel traverse direction are defined,
each of the first edge portion and the second edge portion includes a first portion extending approximately parallel to the pixel longitudinal direction and a second portion extending approximately parallel to the pixel traverse direction,
the pixel electrode has a plurality of first slits formed in a region corresponding to the first liquid crystal domain and extending approximately parallel to the first direction, a plurality of second slits formed in a region corresponding to the second liquid crystal domain and extending approximately parallel to the second direction, a plurality of third slits formed in a region corresponding to the third liquid crystal domain and extending approximately parallel to the third direction, and a plurality of fourth slits formed in a region corresponding to the fourth liquid crystal domain and extending approximately parallel to the fourth direction,
the third liquid crystal domain is adjacent to the first liquid crystal domain in the pixel longitudinal direction and adjacent to the second liquid crystal domain in the pixel traverse direction,
the fourth liquid crystal domain is adjacent to the first liquid crystal domain in the pixel traverse direction and adjacent to the second liquid crystal domain in the pixel longitudinal direction,
each of the plurality of third slits is shorter than one-half of a width of the third liquid crystal domain along the pixel traverse direction, and is located in a vicinity of the second liquid crystal domain in the region corresponding to the third liquid crystal domain,
each of the plurality of fourth slits is shorter than one-half of a width of the fourth liquid crystal domain along the pixel traverse direction, and is located in a vicinity of the first liquid crystal domain in the region corresponding to the fourth liquid crystal domain, the number of the plurality of first slits is less than the number of the plurality of third slits and the number of the plurality of fourth slits, the number of the plurality of second slits is less than the number of the plurality of third slits and the number of the plurality of fourth slits, each of the plurality of first slits is shorter than a width of the first liquid crystal domain along the pixel traverse direction, and is located in a vicinity of an intersection of the first portion and the second portion of the first edge portion in the region corresponding to the first liquid crystal domain, and each of the plurality of second slits is shorter than a width of the second liquid crystal domain along the pixel traverse direction, and is located in a vicinity of an intersection of the first portion and the second portion of the second edge portion in the region corresponding to the second liquid crystal domain.

20. The liquid crystal display device according to claim 19,
wherein a length of each of the plurality of third slits is 6 µm or more and 10 µm or less, and
a length of each of the plurality of fourth slits is 6 µm or more and 10 µm or less.

21. The liquid crystal display device according to claim 19,
wherein the plurality of first slits are three first slits,
among the three first slits, one first slit is longer than other two first slits, and is arranged between the other two first slits,
the plurality of second slits are three second slits, and
among the three second slits, one second slit is longer than other two second slits, and is arranged between the other two second slits.

22. The liquid crystal display device according to claim 21,
wherein a length of the one first slit among the three first slits is 11 µm or more and 15 µm or less, and a length of the other two first slits is 6 µm or more and 10 µm or less, and
a length of the one second slit among the three second slits is 11 µm or more and 15 µm or less, and a length of the other two second slits is 6 µm or more and 10 µm or less.

* * * * *